(12) United States Patent
Mori et al.

(10) Patent No.: US 10,573,278 B2
(45) Date of Patent: Feb. 25, 2020

(54) DISPLAY CONTROL METHOD, DISPLAY CONTROL DEVICE, AND NON-TRANSITORY COMPUTER-READABLE RECORDING MEDIUM STORING DISPLAY CONTROL PROGRAM

(71) Applicant: FUJITSU LIMITED, Kawasaki-shi, Kanagawa (JP)

(72) Inventors: Yuka Mori, Kawasaki (JP); Yoshiharu Kamata, Yokohama (JP); Kenji Kita, Kawasaki (JP); Takaharu Kadooka, Ohta (JP)

(73) Assignee: FUJITSU LIMITED, Kawasaki (JP)

( * ) Notice: Subject to any disclaimer, the term of this patent is extended or adjusted under 35 U.S.C. 154(b) by 39 days.

(21) Appl. No.: 15/867,987

(22) Filed: Jan. 11, 2018

(65) Prior Publication Data

US 2018/0204543 A1 Jul. 19, 2018

(30) Foreign Application Priority Data

Jan. 18, 2017 (JP) .................................. 2017-006752

(51) Int. Cl.
*G09G 5/38* (2006.01)
*G09G 5/14* (2006.01)
(Continued)

(52) U.S. Cl.
CPC ............... *G09G 5/38* (2013.01); *A63H 33/22* (2013.01); *A63H 33/26* (2013.01); *A63H 33/42* (2013.01);
(Continued)

(58) Field of Classification Search
None
See application file for complete search history.

(56) References Cited

U.S. PATENT DOCUMENTS

2002/0024517 A1* 2/2002 Yamaguchi ............. A63F 13/10
345/424
2003/0151562 A1* 8/2003 Kulas .................... G06F 3/1446
345/1.1
(Continued)

FOREIGN PATENT DOCUMENTS

JP 2002-58045 2/2002
JP 2012-58968 3/2012
JP 2013-182618 9/2013

OTHER PUBLICATIONS

Van Velthoven, Lieven. "Room Racers: Design and Evaluation of a Mixed Reality Game Prototype." Master's thesis, Media Technology, Leiden University, the Netherlands (2012).*

*Primary Examiner* — Ryan M Gray
(74) *Attorney, Agent, or Firm* — Fujitsu Patent Center

(57) ABSTRACT

A display control method includes: obtaining a position of an object which is arranged in an area when receiving an input; determining, in accordance with the position of the object, a first display position of at least a first image between the first image and a second image in a display area of a display device adjacent to the area; displaying the first image and the second image on the display device; and changing, after receiving the input, the first display position of the first image in accordance with a change in a position of the object in the area without changing a second display position of the second image.

15 Claims, 21 Drawing Sheets

(51) Int. Cl.

| | | |
|---|---|---|
| *A63H 33/26* | (2006.01) | |
| *A63H 33/22* | (2006.01) | |
| *A63H 33/42* | (2006.01) | |
| *A63J 1/02* | (2006.01) | |
| *A63J 13/00* | (2006.01) | |
| *G06F 3/01* | (2006.01) | |
| *G06F 3/14* | (2006.01) | |
| *A63H 3/00* | (2006.01) | |
| *A63H 17/05* | (2006.01) | |
| *G06F 3/023* | (2006.01) | |
| *A63J 5/02* | (2006.01) | |

(52) U.S. Cl.
CPC ................ *A63J 1/02* (2013.01); *A63J 13/00* (2013.01); *G06F 3/011* (2013.01); *G06F 3/1423* (2013.01); *G09G 5/14* (2013.01); *A63H 3/00* (2013.01); *A63H 17/05* (2013.01); *A63H 2200/00* (2013.01); *A63J 5/021* (2013.01); *G06F 3/023* (2013.01); *G06F 3/1446* (2013.01); *G09G 2340/0464* (2013.01); *G09G 2354/00* (2013.01)

(56) References Cited

U.S. PATENT DOCUMENTS

| | | |
|---|---|---|
| 2012/0056992 A1 | 3/2012 | Kuroda |
| 2012/0306932 A1* | 12/2012 | Nakao .................. G09G 5/38 345/672 |
| 2013/0227609 A1 | 8/2013 | Winter et al. |
| 2014/0378023 A1* | 12/2014 | Muthyala .............. G06T 19/00 446/91 |
| 2015/0268717 A1* | 9/2015 | Schlumberger ........ A63F 13/00 345/156 |
| 2016/0067604 A1* | 3/2016 | Yim .................. A63F 3/00643 463/31 |
| 2017/0069134 A1* | 3/2017 | Shapira ................ G06F 3/011 |
| 2017/0270715 A1* | 9/2017 | Lindsay ............... G06F 3/011 |

* cited by examiner

FIG. 3

| PART ID | PART IMAGE (IN DIRECTION $\theta$) | | | | MOVABLE PORTION FLAG |
|---|---|---|---|---|---|
| | $\theta = 0°$ | $\theta = \alpha°$ | $\theta = 2\alpha°$ | ... | |
| 001 | imag0 | imag$\alpha$ | imag2$\alpha$ | ... | 0 |
| 002 | imag0 | imag$\alpha$ | imag2$\alpha$ | ... | 1 |
| ⋮ | ⋮ | ⋮ | ⋮ | ⋮ | ⋮ |

| PART ID | FIRST IMAGE INFORMATION | | | SECOND IMAGE INFORMATION | | | | | |
|---|---|---|---|---|---|---|---|---|---|
| | MOVABLE PORTION FLAG | FIRST IMAGE | THREE DIMENSIONS MODEL | SECOND IMAGE | POSITION CHANGE FLAG | POSITION CHANGE INFORMATION | DIRECTION FLAG | DIRECTIONAL INFORMATION | SOUND INFORMATION |
| 001 | 0 | img1 | – | img2 | 0 | – | 0 | – | sound |
| 002 | 0 | img1 | – | img2 | 1 | x | 0 | – | – |
| 003 | 1 | – | model | img2 | 1 | x | 1 | y | sound |
| ... | ... | ... | ... | ... | ... | ... | ... | ... | ... |

| PART | FIRST IMAGE | SECOND IMAGE | SOUND |
|---|---|---|---|
| CAR | SHADOW (MOVABLE PORTION FLAG = 0) | ROAD (POSITION CHANGE AND DIRECTION FLAGS = 1) | DRIVING SOUNDS |
| RABBIT | SHADOW (MOVABLE PORTION FLAG = 0) | SUN SETS AND MOON RISES (MOVING IMAGE; POSITION CHANGE AND DIRECTION FLAGS = 0) | — |
| DOG | SHADOW AND FOOTPRINTS (MOVABLE PORTION FLAG = 0) | DOG FOOD (POSITION CHANGE FLAG = 1, DIRECTION FLAG = 0) | CRY |
| BIRD | SHADOW (MOVABLE PORTION FLAG = 0) | PERCH (POSITION CHANGE AND DIRECTION FLAGS = 1) | CRY |
| CAT | SHADOW AND FOOTPRINTS (MOVABLE PORTION FLAG = 0) | BALL OF YARN (POSITION CHANGE FLAG = 1, DIRECTION FLAG = 0) | CRY |
| WHALE | WAVES (MOVABLE PORTION FLAG = 0) | WATER SURFACE (POSITION CHANGE FLAG = 1, DIRECTION FLAG = 0) | SOUND OF WAVES |
| FLOWER | SHADOW, SMALLER FLOWERS, AND BUTTERFLY (MOVABLE PORTION FLAG = 0) | FLOWER GARDEN (POSITION CHANGE FLAG = 1, DIRECTION FLAG = 0) | — |
| HOUSE | SHADOW AND SHADOW OF OPENABLE WINDOW (MOVABLE PORTION FLAG = 1) | STONE PAVEMENT (POSITION CHANGE FLAG = 1, DIRECTION FLAG = 0) | — | ns # DISPLAY CONTROL METHOD, DISPLAY CONTROL DEVICE, AND NON-TRANSITORY COMPUTER-READABLE RECORDING MEDIUM STORING DISPLAY CONTROL PROGRAM

CROSS-REFERENCE TO RELATED APPLICATION

This application is based upon and claims the benefit of priority of the prior Japanese Patent Application No. 2017-006752, filed on Jan. 18, 2017, the entire contents of which are incorporated herein by reference.

FIELD

The embodiment discussed herein is related to a display control device and a non-transitory computer-readable recording medium storing a display control program.

BACKGROUND

Computers generate and display images.
Japanese Laid-open Patent Publication No. 2002-58045 discloses an example of the related art.

SUMMARY

According to an aspect of the embodiments, a display control method comprising: obtaining, by a computer, a position of an object which is arranged in an area when receiving an input; determining, in accordance with the position of the object, a first display position of at least a first image between the first image and a second image in a display area of a display device adjacent to the area; displaying the first image and the second image on the display device; and changing, after receiving the input, the first display position of the first image in accordance with a change in a position of the object in the area without changing a second display position of the second image.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 illustrates an example of a part information database;

FIG. 4 illustrates an example of a display image database;

FIG. 5 illustrates an example of information registered in a display image database;

DESCRIPTION OF EMBODIMENT

For example, an image of an actual object making a certain motion is captured, and three-dimensional model data capable of making the same motion as the actual object is created. For example, an image in which a visual object based on the three-dimensional model data is arranged in a virtual three-dimensional space is generated and displayed, and the visual object is caused to make the same motion as the actual object in a real-time manner.

For example, a visual object that imitates a user who makes motions is arranged in a virtual three-dimensional space and caused to make the same motions as the user. An actual object imitated by a visual object, therefore, is supposed to be an object that makes motions. If a still object is used as an actual object imitated by a visual object, for example, the visual object in a virtual three-dimensional space remains still, and a displayed image does not change.

For example, an image displayed along with an object may be changed through a simple operation.

Figure 1:
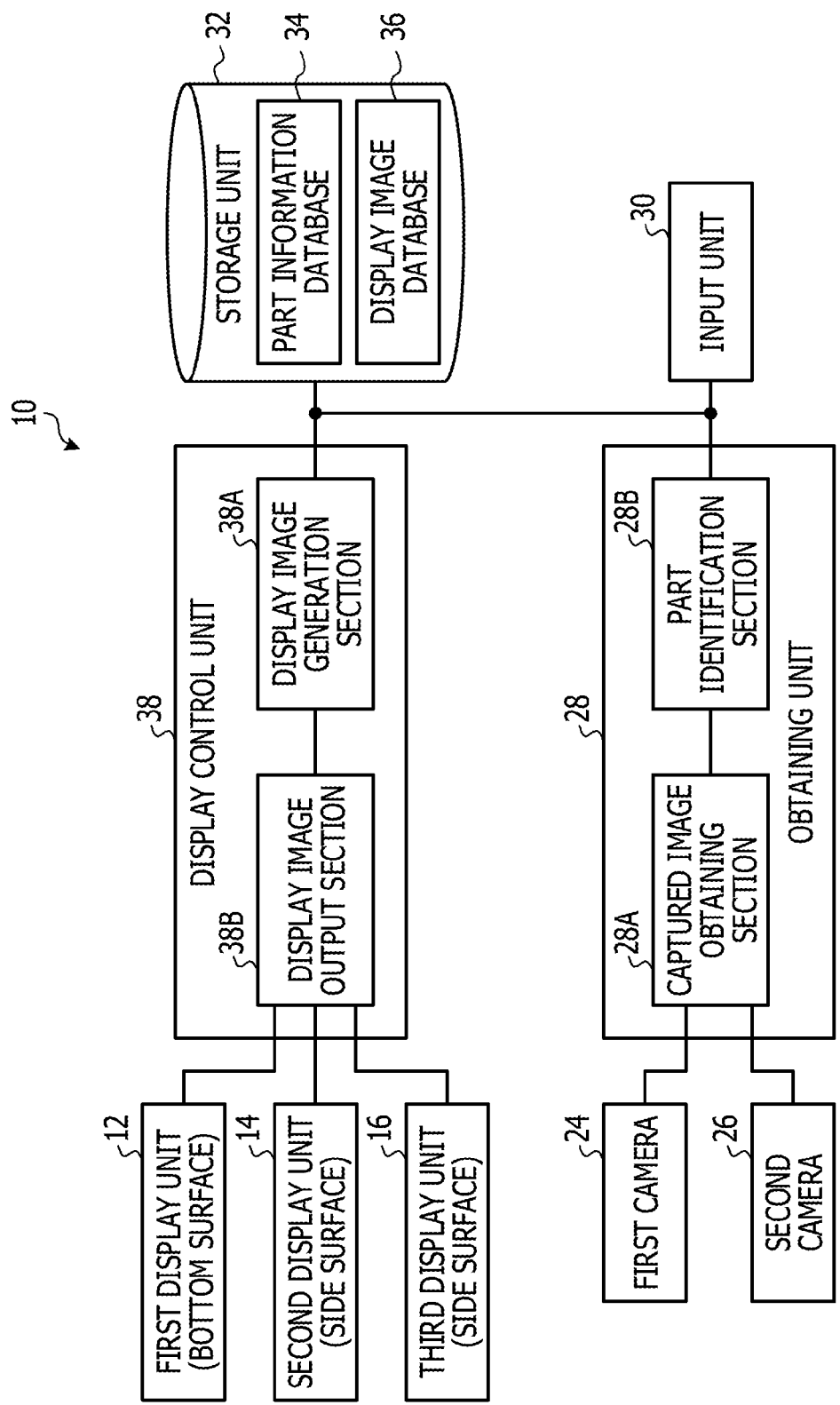
FIG. 1 illustrates an example of functional blocks of an amusement device.

An amusement device 10 illustrated in FIG. 1 may be a type of toy with which a user such as a child plays, and includes a first display unit 12, a second display unit 14, and a third display unit 16. The first to third display units 12, 14, and 16 are achieved, for example, by liquid crystal displays (LCDs), organic electroluminescent displays (OELDs), or the like. Although three display units are provided in FIG. 1, the amusement device 10 may include only the first display unit 12, instead.

Figure 2:
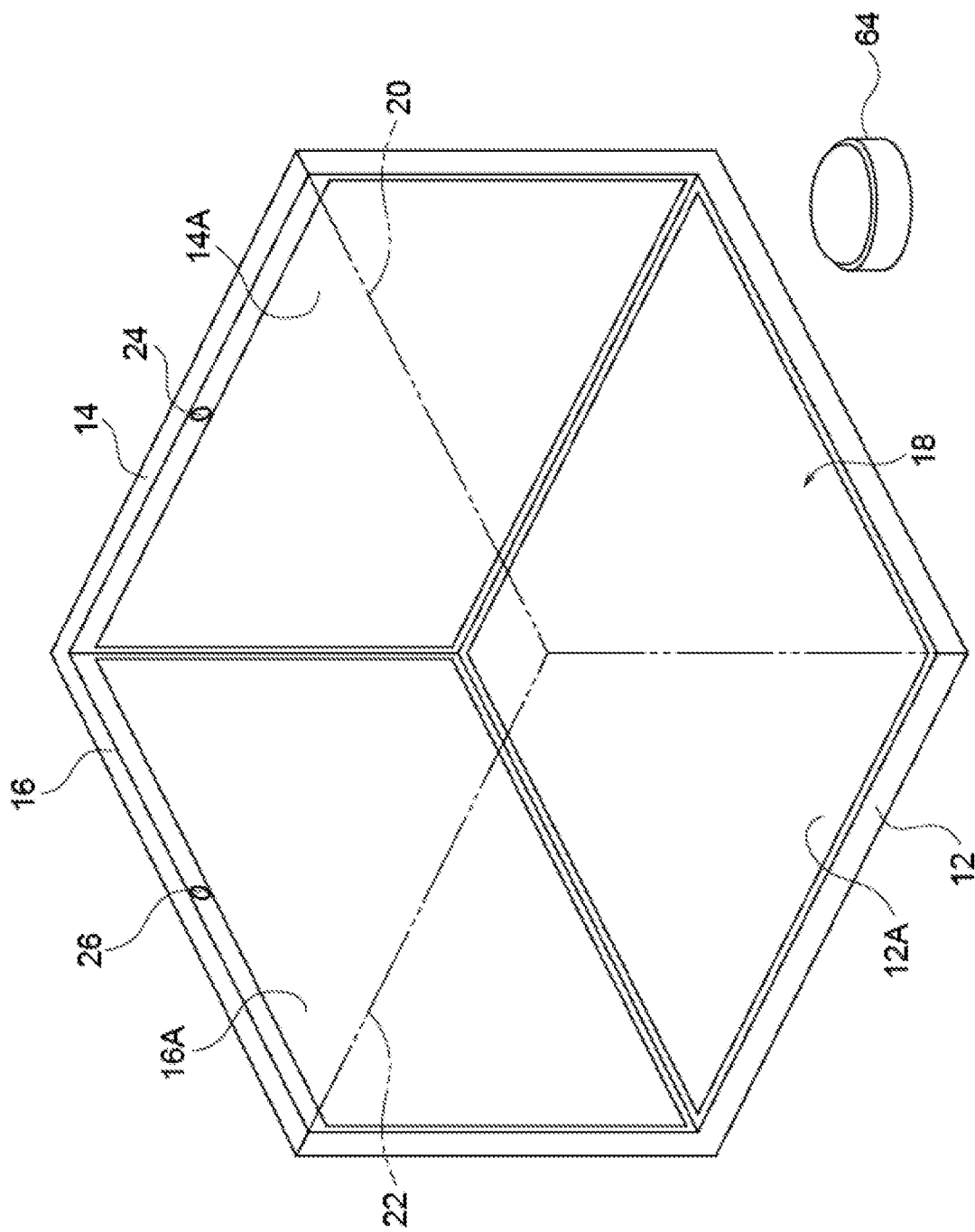
FIG. 2 is an example of a perspective view of the arrangement of display units and cameras.

As illustrated in FIG. 2, the first display unit 12 is arranged such that a display surface 12A forms a bottom surface of an amusement space 18, and the second display unit 14 is connected to the first display unit 12 such that a display surface 14A forms a first side surface of the amusement space 18. The third display unit 16 is connected to the first and second display units 12 and 14 such that a display surface 16A forms a second side surface (a side surface that is substantially perpendicular to the first side surface) of the amusement space 18. The first to third display units 12, 14, and 16 may be an example of a display device in the present disclosure, and the amusement space 18 formed by the first to third display units 12, 14, and 16 may be an example of a certain area.

It is desirable that, in the amusement device 10, a wall member 20 (indicated by an imaginary line in FIG. 2) that forms a third side surface of the amusement space 18 facing the first side surface and a wall member 22 (indicated by an imaginary line in FIG. 2) that forms a fourth side surface of the amusement space 18 facing the second side surface be removable. In this case, the first to third display units 12, 14, and 16 and the wall members 20 and 22 together form a box, and a "done" button unit, which will be described later, and other parts attached to the amusement device 10 can be stored in the box when the user puts the amusement device 10 away.

In this state, a lid member (not illustrated) that closes an upper surface of the amusement space 18 can be attached. When the lid member is attached, the overall strength of the amusement device 10 improves, and the "done" button unit and the other parts stored inside the box are not scattered. When the amusement device 10 is used, for example, the lid member and the wall members 20 and 22 are removed as indicated by solid lines in FIG. 2. As a result, three of six surfaces forming the amusement space 18 become open, and the user can see images displayed on the display units 12 to 16.

Figure 10:
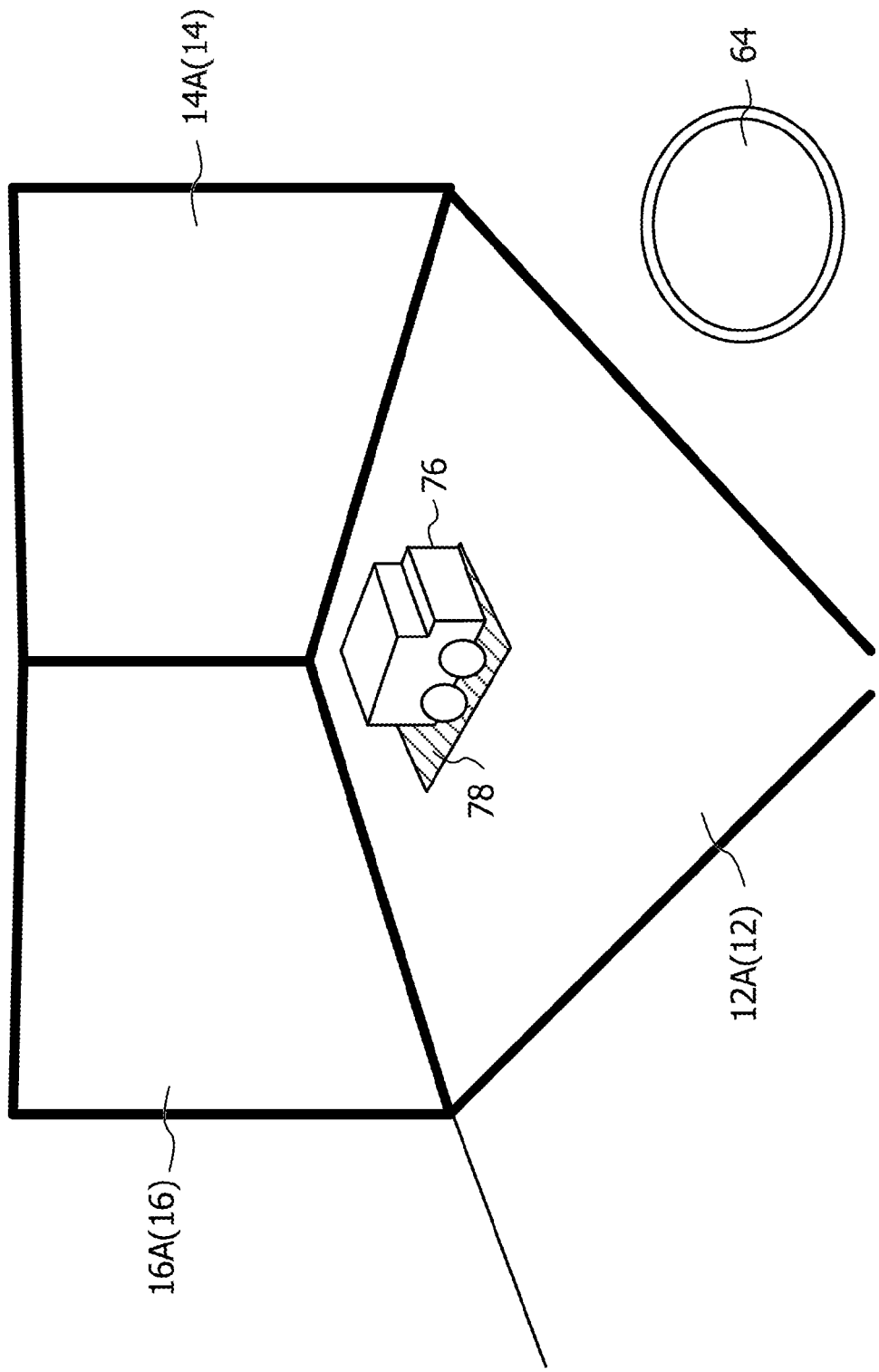
FIG. 10 illustrates an example of a first image displayed when a car is arranged.
Figure 11:
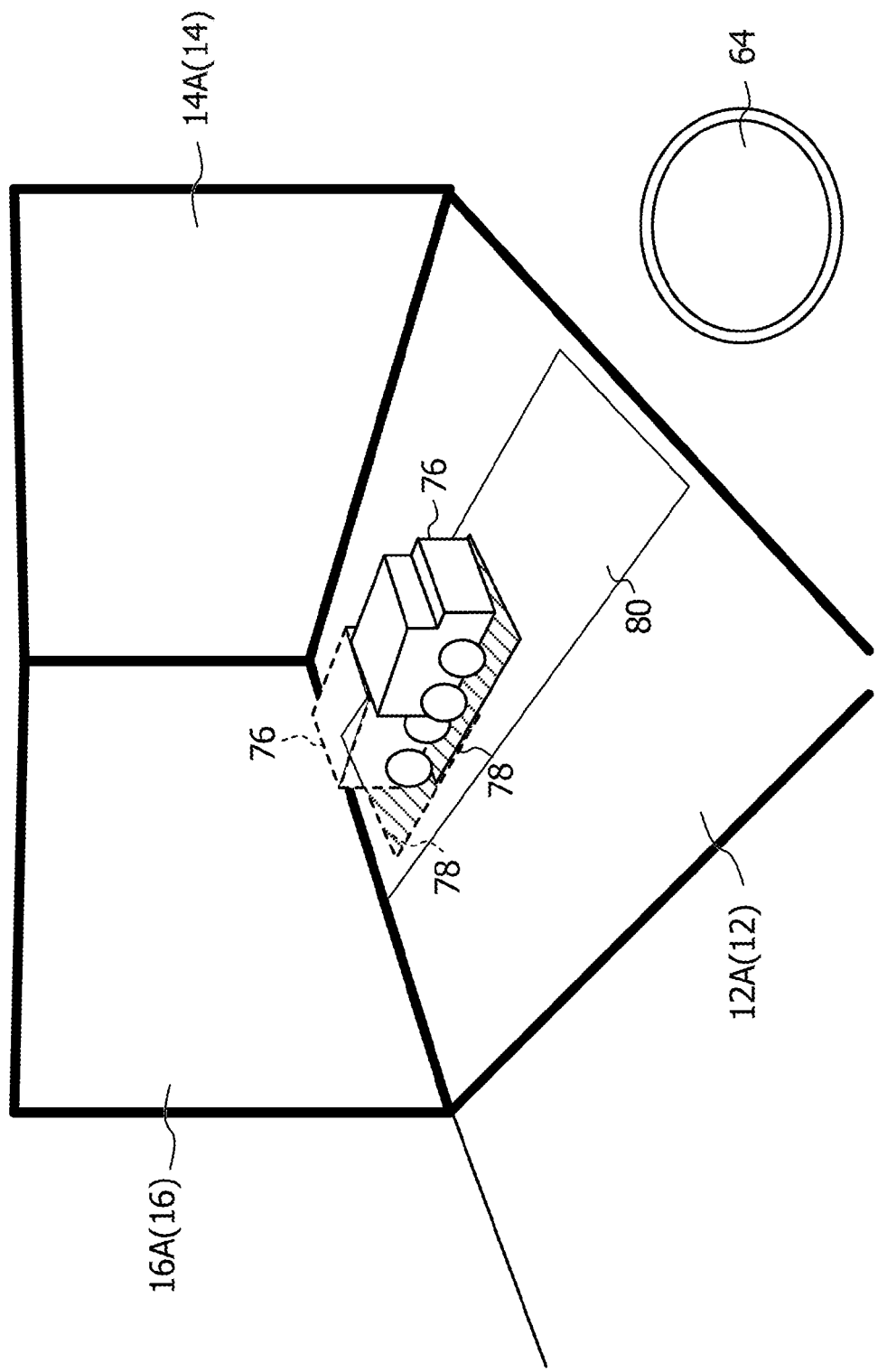
FIG. 11 illustrates an example of the first image and a second image displayed when the car is arranged and a change in a display position of the first image at a time when the car is moved.
Figure 12:
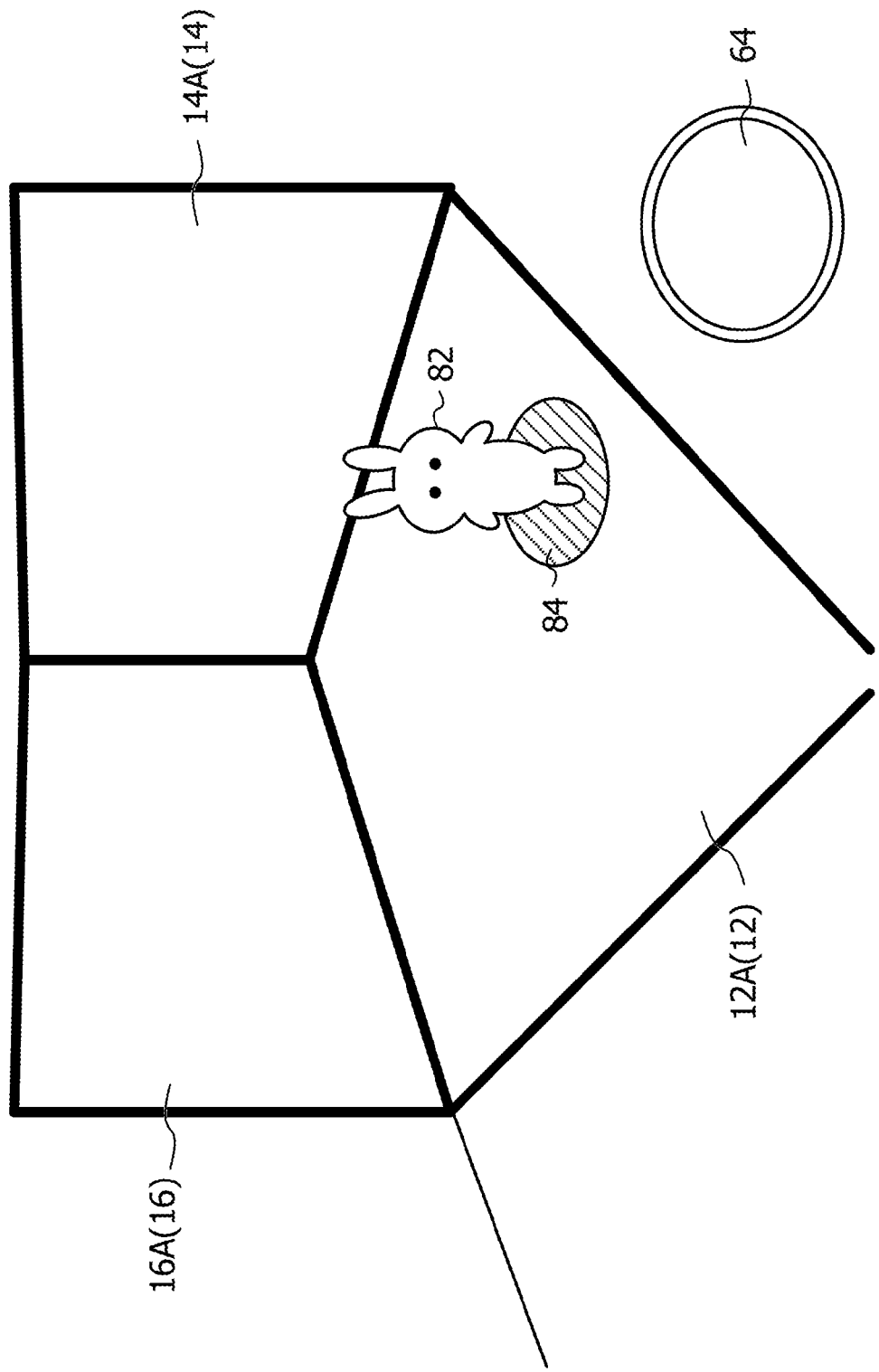
FIG. 12 illustrates an example of a first image displayed when a rabbit is arranged.
Figure 13:
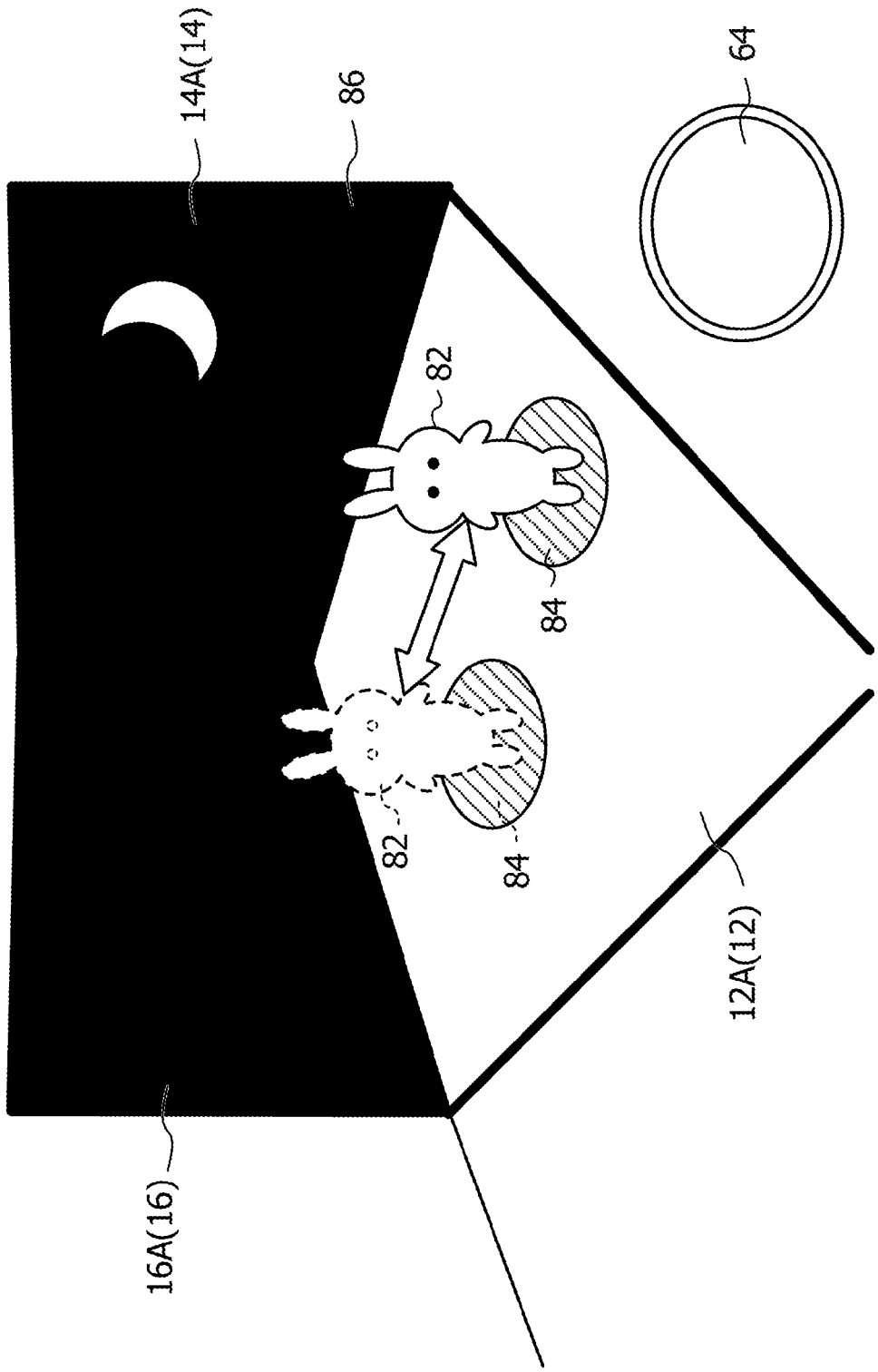
FIG. 13 illustrates an example of the first image and a second image displayed when the rabbit is arranged and a change in a display position of the first image at a time when the rabbit is moved.
Figure 14:
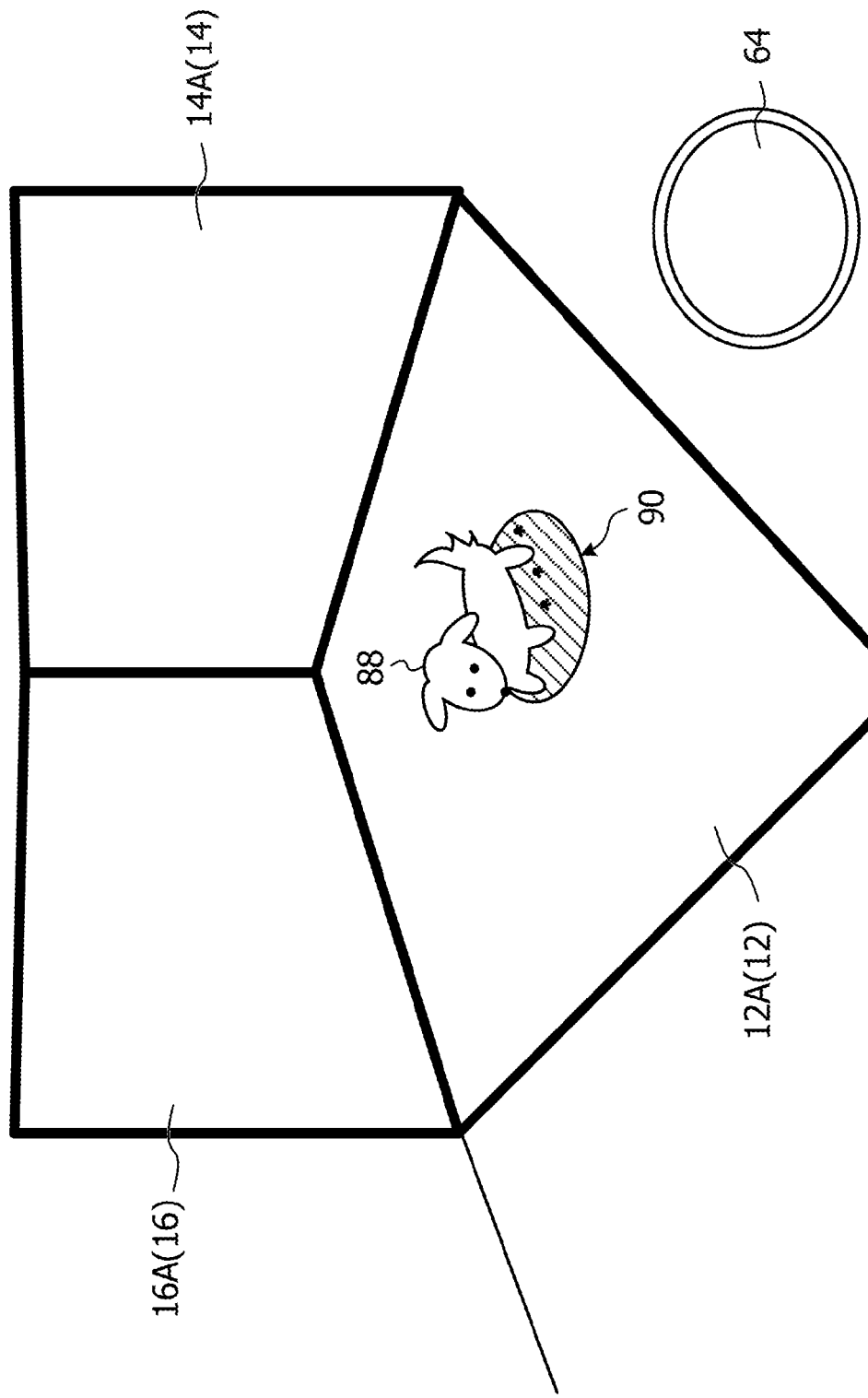
FIG. 14 illustrates an example of a first image displayed when a dog is arranged.
Figure 15:
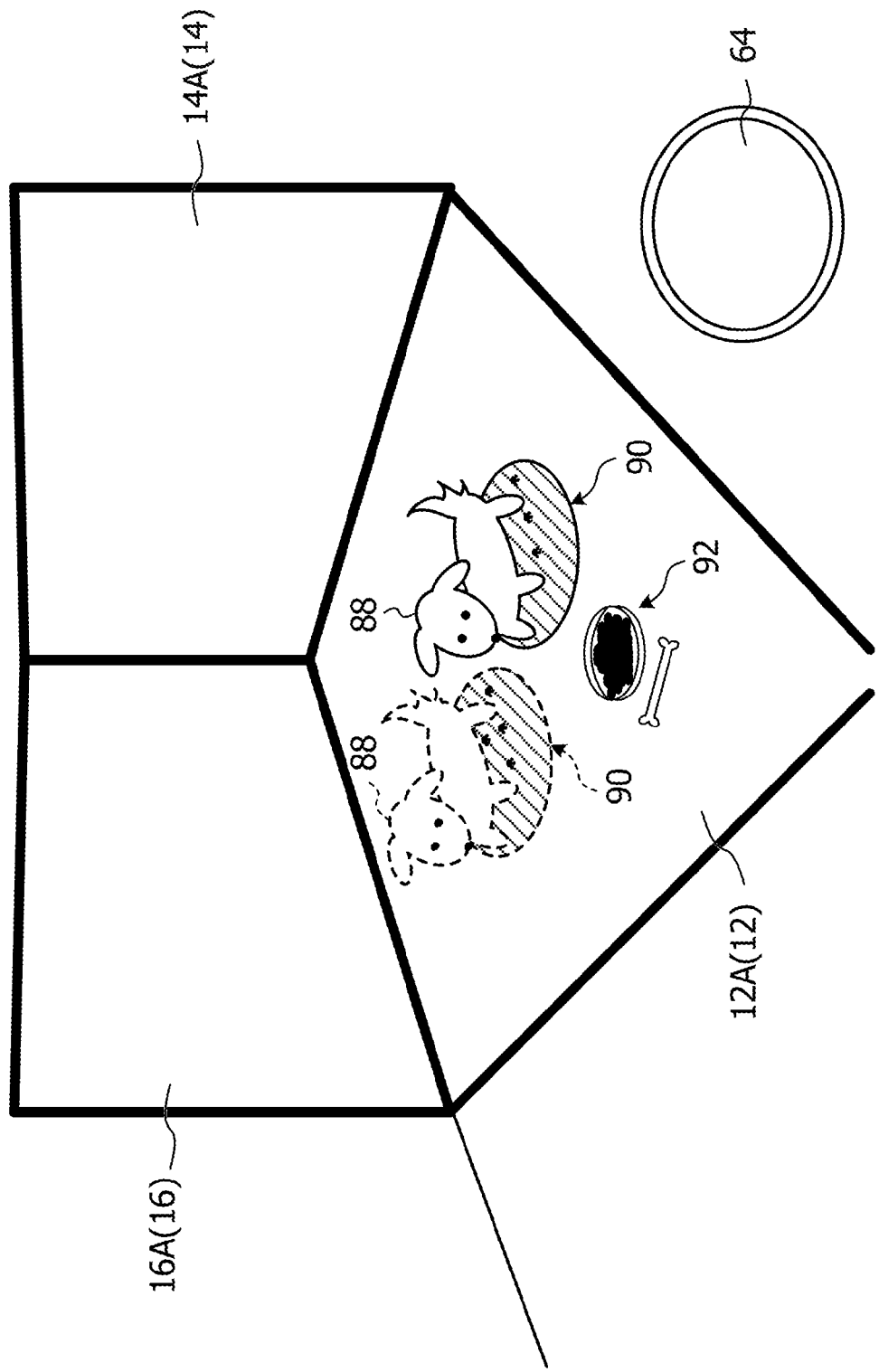
FIG. 15 illustrates an example of the first image and a second image displayed when the dog is arranged and a change in a display position of the first image at a time when the dog is moved.
Figure 16:
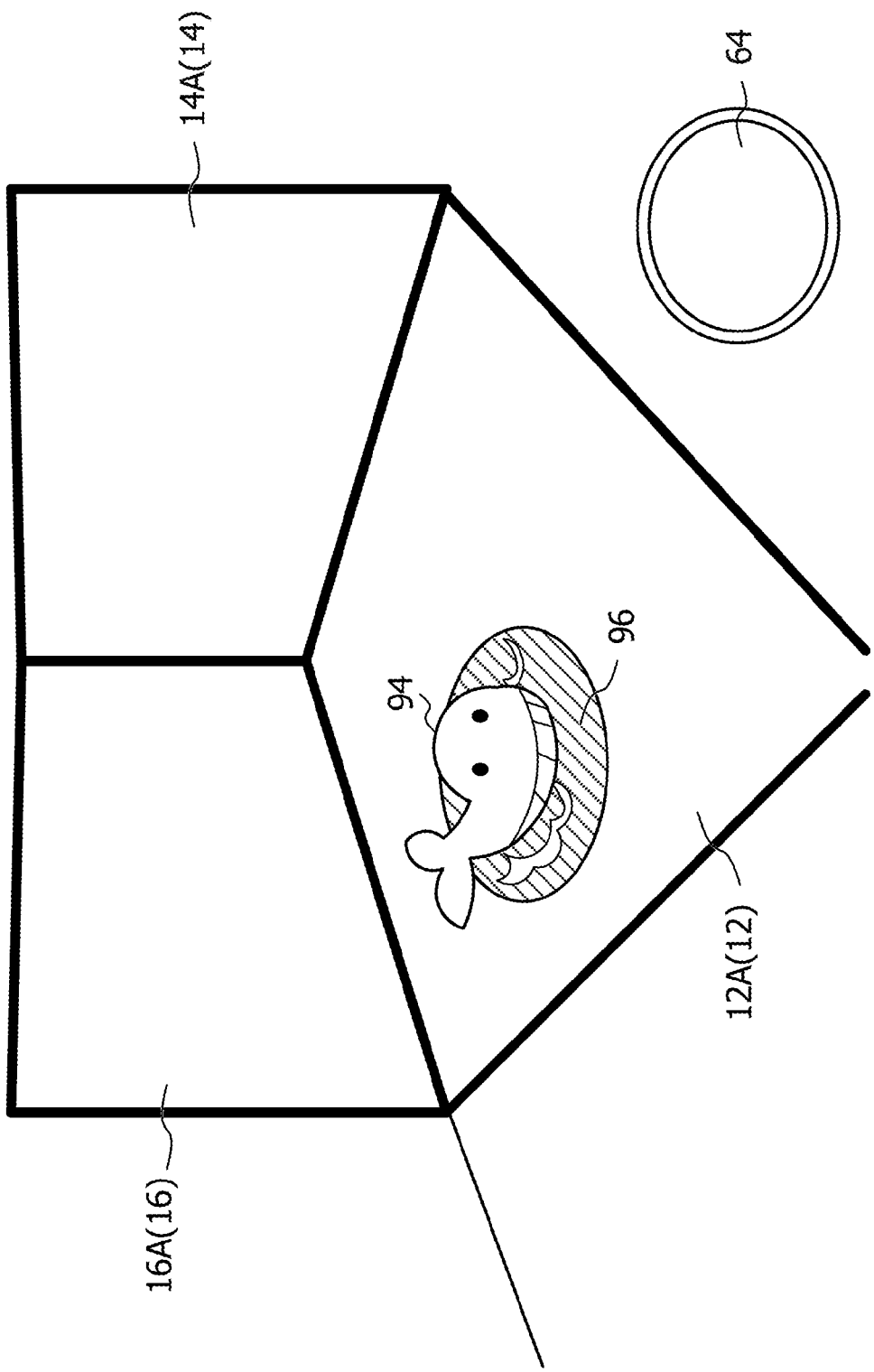
FIG. 16 illustrates an example of a first image displayed when a whale is arranged.
Figure 17:
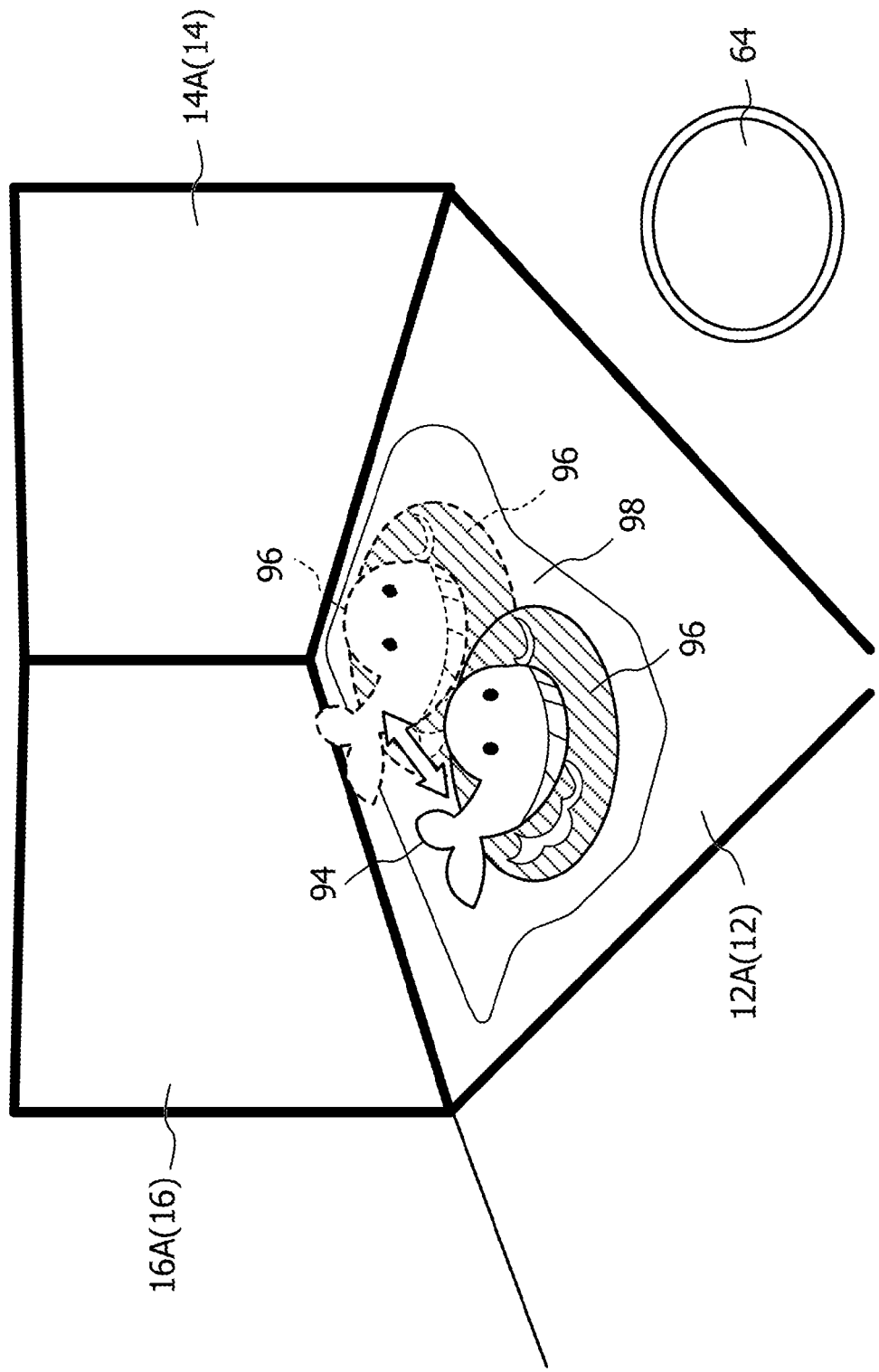
FIG. 17 illustrates an example of the first image and a second image displayed when the whale is arranged and a change in a display position of the first image at a time when the whale is moved.
Figure 18:
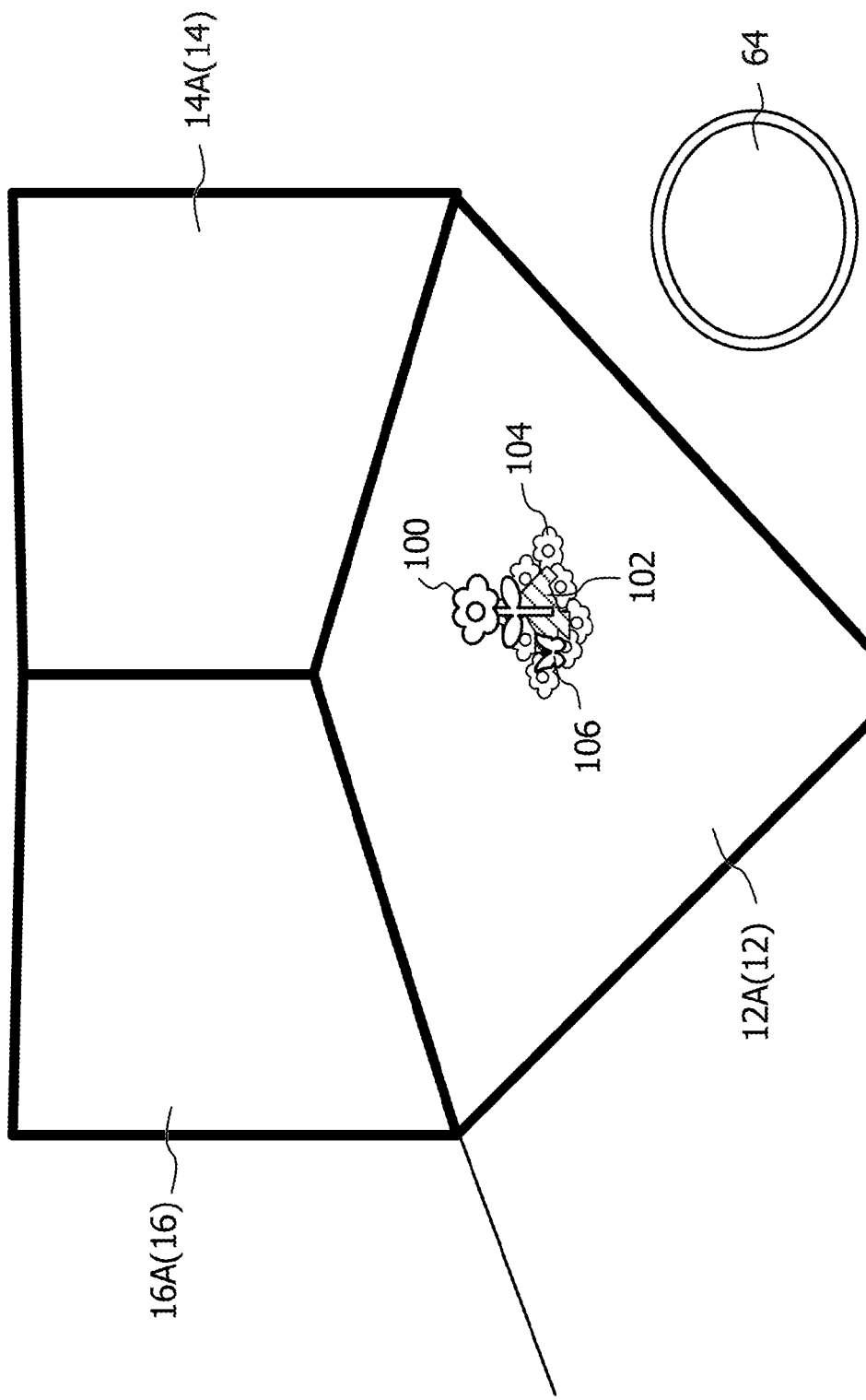
FIG. 18 illustrates an example of a first image displayed when a flower is arranged.
Figure 19:
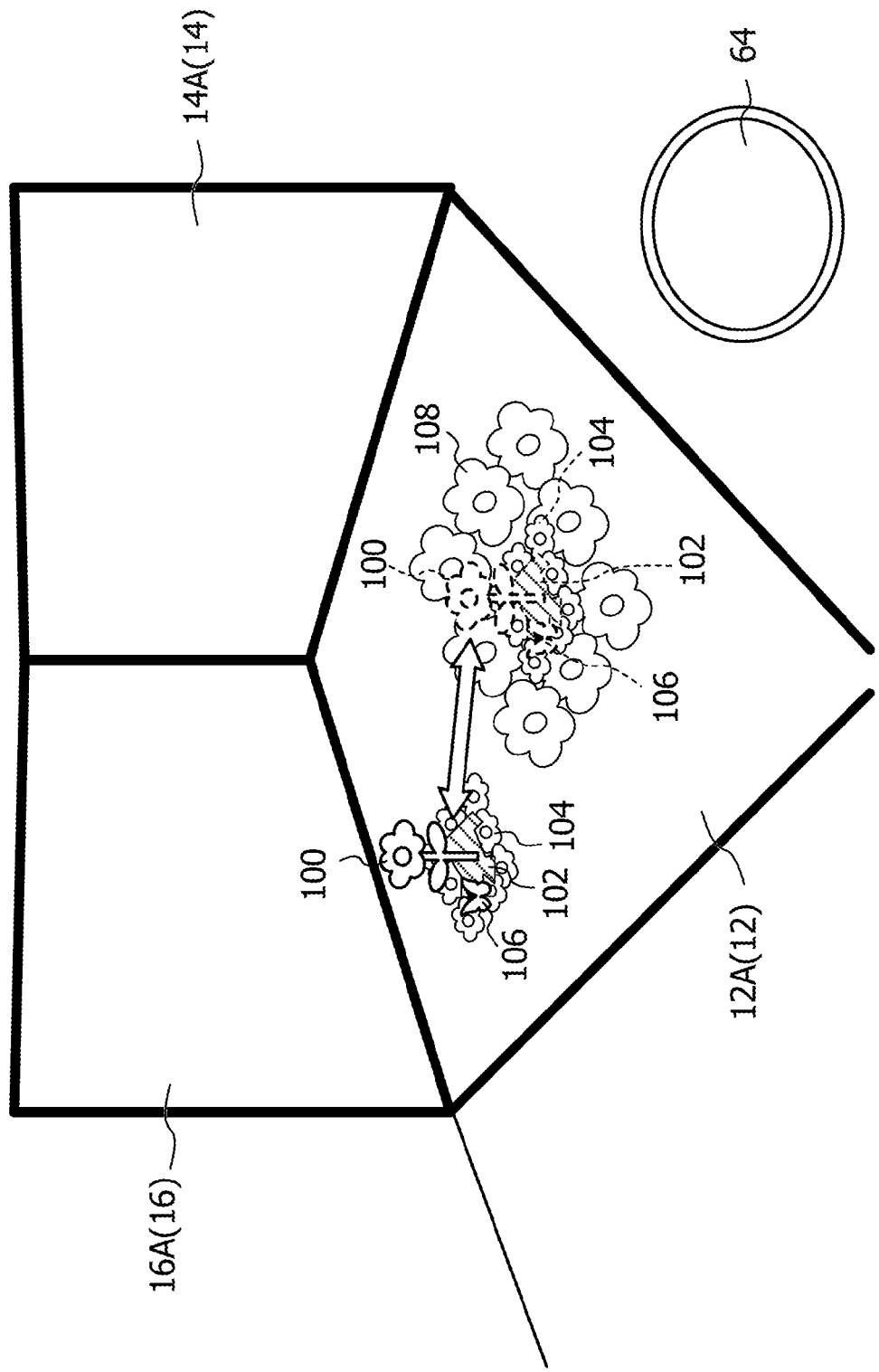
FIG. 19 illustrates an example of the first image and a second image displayed when the flower is arranged and a change in a display position of the first image at a time when the flower is moved.
Figure 20:
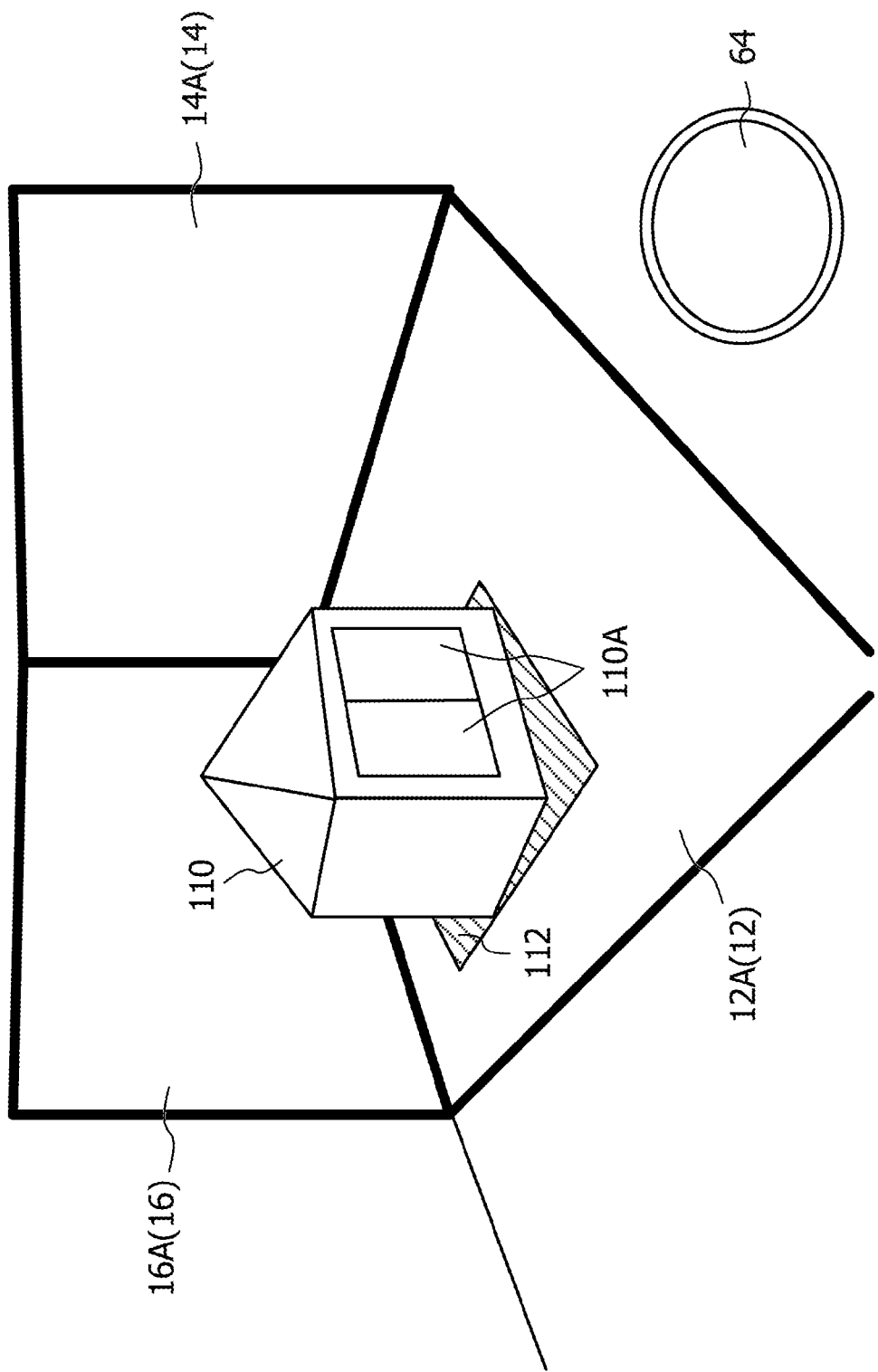
FIG. 20 illustrates an example of a first image displayed when a house is arranged.
Figure 21:
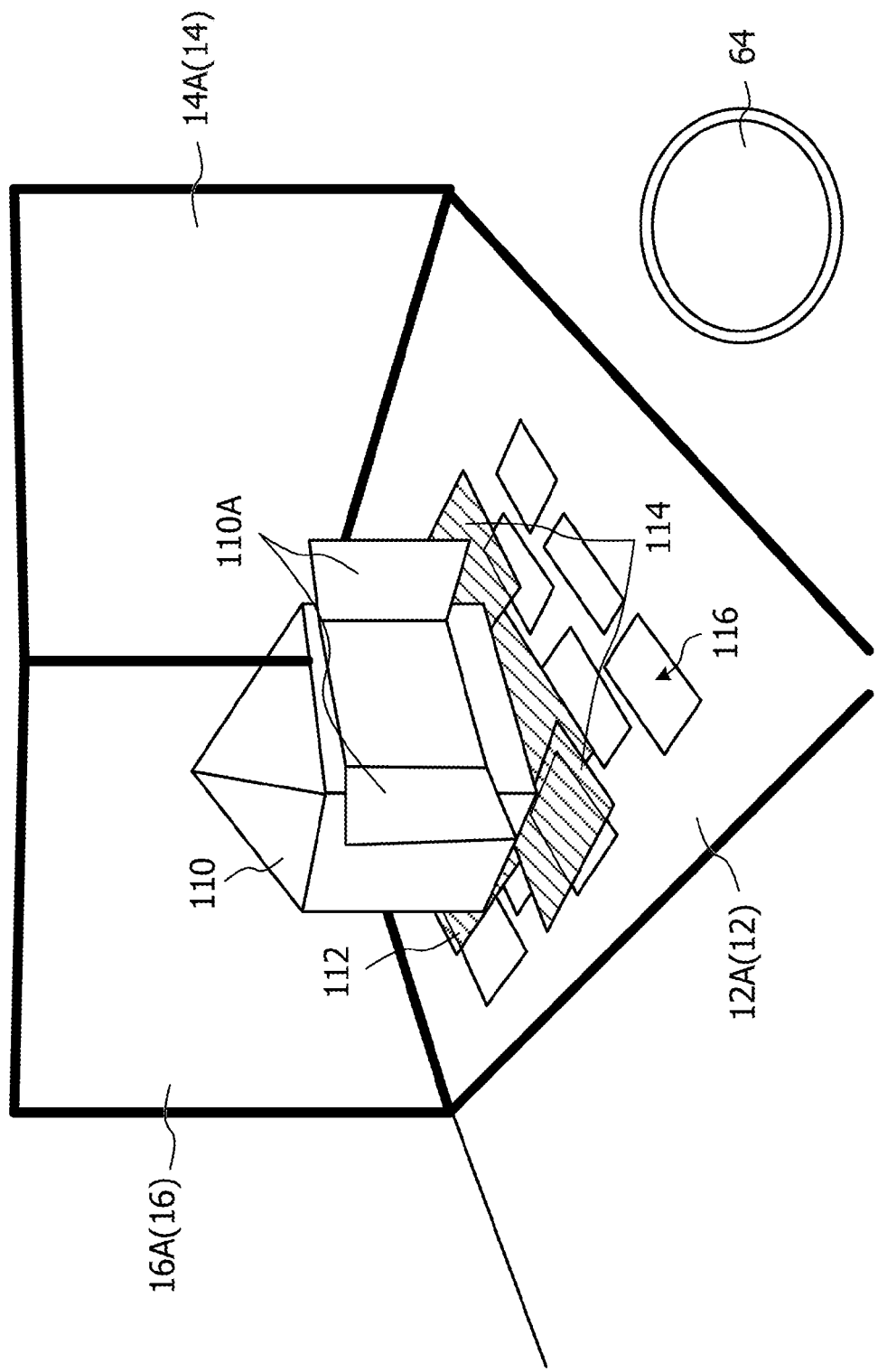
FIG. 21 illustrates an example of the first image and a second image displayed when the house is arranged and a change in a display position of the first image at a time when the house is moved and a position of a window as a movable portion is changed.

The amusement device 10 includes at least one "part", which is a model that can be arranged in the amusement space 18. FIGS. 10 and 11 illustrate a car 76 as an example of the part. FIGS. 12 and 13 illustrate a rabbit 82 as an example of the part. FIGS. 14 and 15 illustrate a dog 88 as an example of the part. FIGS. 16 and 17 illustrate a whale 94 as an example of the part. FIGS. 18 and 19 illustrate a flower 100 as an example of the part. FIGS. 20 and 21 illustrate a house 110 as an example of the part. As can be seen by comparing FIGS. 20 and 21, a window 110A of the house 110 is openable. The above parts may be examples of an object, and the house 110 may be an example of an object including a movable portion.

As illustrated in FIG. 1, the amusement device 10 may include a first camera 24 and a second camera 26 that capture images of the amusement space 18 from different positions. FIG. 2 illustrates, as an example, a mode in which the first camera 24 is arranged near an upper end of the display surface 14A of the second display unit 14 and the second camera 26 is arranged near an upper end of the display surface 16A of the third display unit 16. Angles of view of the first and second cameras 24 and 26 are adjusted such that the entirety of the bottom surface (the display surface 12A of the first display unit 12) of the amusement space 18 is included in image capture ranges of the first and second cameras 24 and 26. The first and second cameras 24 and 26, therefore, can capture images of a part arranged in the amusement space 18.

The first and second cameras 24 and 26 are connected to an obtaining unit 28. The obtaining unit 28 is connected to an input unit 30 with which the user of the amusement device 10 can make certain inputs, a storage unit 32 storing a part information database 34 and a display image database 36, and a display control unit 38. If the obtaining unit 28 receives a certain input through the input unit 30, the obtaining unit 28 obtains a position of a part arranged in the amusement space 18. In addition, the obtaining unit 28 may obtain at least either a type of part or a direction of a part. The obtaining unit 28 includes a captured image obtaining section 28A and a part identification section 28B. If the captured image obtaining section 28A receives a certain input through the input unit 30, the captured image obtaining section 28A obtains captured images from the first and second cameras 24 and 26. The part identification section 28B identifies a type, a position, and a direction of a part arranged in the amusement space 18 based on the captured images obtained by the captured image obtaining section 28A and information registered in the part information database 34.

In the part information database 34, information regarding at least one part attached to the amusement device 10 is registered. As illustrated in FIG. 3 as an example, the information registered in the part information database 34 includes a part identifier (ID) for identifying each part, part images captured from a plurality of different directions, and a movable portion flag indicating whether the part includes a movable portion. The part images can be obtained, for example, by rotating a rotary table on which the part is disposed, capturing images of the part with a camera each time a direction e of the part has changed by a certain angle α, and extracting image areas corresponding to the part from the captured images.

In the display image database 36, information regarding a first image and information regarding a second image to be displayed on the display units 12 to 16 when each part attached to the amusement device 10 is arranged in the amusement space 18 and sound information to be output when the part is arranged in the amusement space 18 are registered. The first image is an image whose display position changes in accordance with changes in a position of a corresponding part in the amusement space 18 and is an example of a first image in the present disclosure. The second image, on the other hand, is an image whose display position does not change in accordance with changes in a position of a corresponding part in the amusement space 18 and is an example of a second image in the present disclosure.

As illustrated in FIG. 4 as an example, the information regarding a first image registered in the display image database 36 includes the above-described movable portion flag, the first image, and a three-dimensional model of a part. The first image and the three-dimensional model of the part are mutually exclusively registered information. That is, when a part does not include a movable portion (movable portion flag=0), a first image is registered. When a part includes a movable portion (movable portion flag=1), a three-dimensional model, which is obtained by modeling a movable portion of the part as a movable portion, is registered. In the case of the house 110 illustrated in FIGS. 20 and 21, for example, a three-dimensional model obtained by modeling the house 110 with the openable window 110A set as a movable portion is registered.

As illustrated in FIG. 5, when a part is the car 76, the rabbit 82, or a bird, a shadow of the part can be an example of the first image (refer to a shadow 78 illustrated in FIGS. 10 and 11 and a shadow 84 illustrated in FIGS. 12 and 13). Since these parts do not include a movable portion, the movable portion flag is set to 0, and an image of a shadow whose degree of transparency is higher than 0 is registered as a first image. When a part is the dog 88 or a cat, a shadow and foot prints of the part can be an example of the first image (refer to a shadow and footprints 90 illustrated in FIGS. 14 and 15). Since these parts do not include a movable portion either, the movable portion flag is set to 0, and an image of a shadow and footprints whose degree of transparency is higher than 0 is registered as a first image.

When a part is the whale 94, waves can be an example of the first image (refer to waves 96 illustrated in FIGS. 16 and 17). Since the whale 94 does not include a movable portion either, the movable portion flag is set to 0, and a moving image of waves is registered as a first image. When a part is the flower 100, a shadow of the flower 100, surrounding smaller flowers, and a butterfly can be examples of the first image (refer to a shadow 102, smaller flowers 104, and a butterfly 106 illustrated in FIGS. 18 and 19). Since the flower 100 does not include a movable portion either, the movable portion flag is set to 0, and an image of a shadow whose degree of transparency is higher than 0, an image of surrounding smaller flowers, and a moving image of a butterfly are registered as first images.

When a part is the house 110, a shadow of the house 110 and shadows of the window 110A that change in accordance with opening and closing of the window 110A can be examples of the first image (refer to a shadow 112 illustrated in FIGS. 20 and 21 and shadows 114 illustrated in FIG. 21). Since the window 110A of the house 110 is openable, the movable portion flag is set to 1, and a three-dimensional model obtained by modeling the house 110 with the openable window 110A set as a movable portion is registered.

As illustrated in FIG. 4, the information regarding a second image registered in the display image database 36 includes the second image, a position change flag indicating whether to change a display position of the second image in accordance with a position of a part, and position change information indicating a positional relationship between the part and the second image at a time when the position change flag is 1. The information regarding the second image also includes a direction flag indicating whether to change a display direction of the second image in accordance with a direction of the part and directional information indicating a relationship between the direction of the part and the display direction of the second image at a time when the direction flag is 1.

As illustrated in FIG. 5, when a part is the car 76, a road 80 illustrated in FIG. 11 can be an example of a second image, and an image of the road 80 is registered as a second image. Because it is desirable to display the road 80 at a position and in a direction according to the car 76, the position change flag and the direction flag are both set to 1, and the position change information and the directional information are set such that the road 80 is displayed at a position and in a direction according to an original position and an original direction of the car 76. When a part is the rabbit 82, a night sky 86 illustrated in FIG. 13 in which the sun sets and the moon rises can be an example of a second image, and a moving image of the night sky 86 is registered as a second image. Because the night sky 86 is displayed on the second and third display units 14 and 16 regardless of changes in a position and a direction of the rabbit 82, the position change flag and the direction flag are both set to 0.

When a part is the dog 88, a dog food 92 illustrated in FIG. 15 can be an example of a second image, and an image of the dog food 92 is registered as a second image. Because it is desirable to display the dog food 92 at a position according to the dog 88, the position change flag is set to 1 and the direction flag is set to 0, and the position change information is set such that the dog food 92 is displayed at a position according to an original position of the dog 88. When a part is a bird, a perch can be an example of a second image, and an image of the perch is registered as a second image. Because it is desirable to display the perch at a position and in a direction according to the bird, the position change flag and the direction flag are both set to 1, and the position change information and the directional information are set such that the perch is displayed at a position and in a direction according to an original position and an original direction of the bird.

When a part is a cat, a ball of yarn (not illustrated) can be an example of a second image, and an image of the ball of yarn is registered as a second image. Because it is desirable to display the ball of yarn at a position and in a direction according to the cat, the position change flag and the direction flag are both set to 1, and the position change information is set such that the ball of yarn is displayed at a position according to the cat. When a part is the whale 94, a water surface 98 illustrated in FIG. 17 can be an example of a second image, and an image of the water surface 98 is registered as a second image. In the present embodiment, in order to display the water surface 98 in a certain area according to an original position of the whale 94, the position change flag is set to 1 and the direction flag is set to 0, and the position change information is set such that the water surface 98 is displayed in the certain area according to the original position of the whale 94. The water surface 98 may be displayed over the entirety of the display surface 12A of the first display unit 12, instead.

When a part is the flower 100, a flower garden 108 illustrated in FIG. 19 can be an example of a second image, and an image of the flower garden 108 is registered as a second image. In order to display the flower garden 108 in a certain area according to an original position of the flower 100, for example, the position change flag is set to 1 and the direction flag is set to 0, and the position change information is set such that the flower garden 108 is displayed in the certain area according to the original position of the flower 100. The flower garden 108 may be displayed over the entirety of the display surface 12A of the first display unit 12, instead. When a part is the house 110, a stone pavement 116 illustrated in FIG. 21 can be an example of a second image, and an image of the stone pavement 116 is registered as a second image. In the present embodiment, in order to display the stone pavement 116 in a certain area according to the original position of the house 110, the position change flag is set to 1 and the direction flag is set to 0, and the position change information is set such that the stone pavement 116 is displayed in the certain area according to the original position of the house 110.

Sound information is registered in the display image database 36 only for parts that output sounds when arranged in the amusement space 18. For example, FIG. 5 illustrates an example in which driving sounds (an engine sound or a horn sound) are output when a part arranged in the amusement space 18 is the car 76, a cry is output when the part is the dog 88, the bird, or the cat, and the sound of waves is output when the part is the whale 94.

The display control unit 38 includes a display image generation section 38A and a display image output section 38B and is connected to the display units 12 to 16. If the display image generation section 38A receives a certain input through the input unit 30, the display image generation section 38A determines display positions of first and second images based on a position of a part arranged in the amusement space 18 obtained by the obtaining unit 28. At this time, the display image generation section 38A determines the display position of the first image in accordance with the position of the part and, if a position change flag of the second image is 1, determines the display position of the second image in accordance with the position of the part. If a direction flag of the second image is 1, the display image generation section 38A determines a display direction of the second image in accordance with a direction of the part.

The display image generation section 38A generates images to be displayed on the display units 12 to 16 based on the determined display positions of the first and second images. The display image output section 38B displays the images generated by the display image generation section 38A on the display units 12 to 16. After receiving the certain input, the display image generation section 38A changes the display position of the first image in accordance with a change in the position of the part in the amusement space 18 but continues to display the second image without changing the display position. When the part is a car and the display image generation section 38A has received a certain input, for example, the display image generation section 38A displays a shadow, which is a first image, at a position according to the position of the car and a road, which is a second image. If the position of the car is changed thereafter, the display image generation section 38A changes the position of the shadow in accordance with the new position of the car without changing a position of the road.

Figure 6:
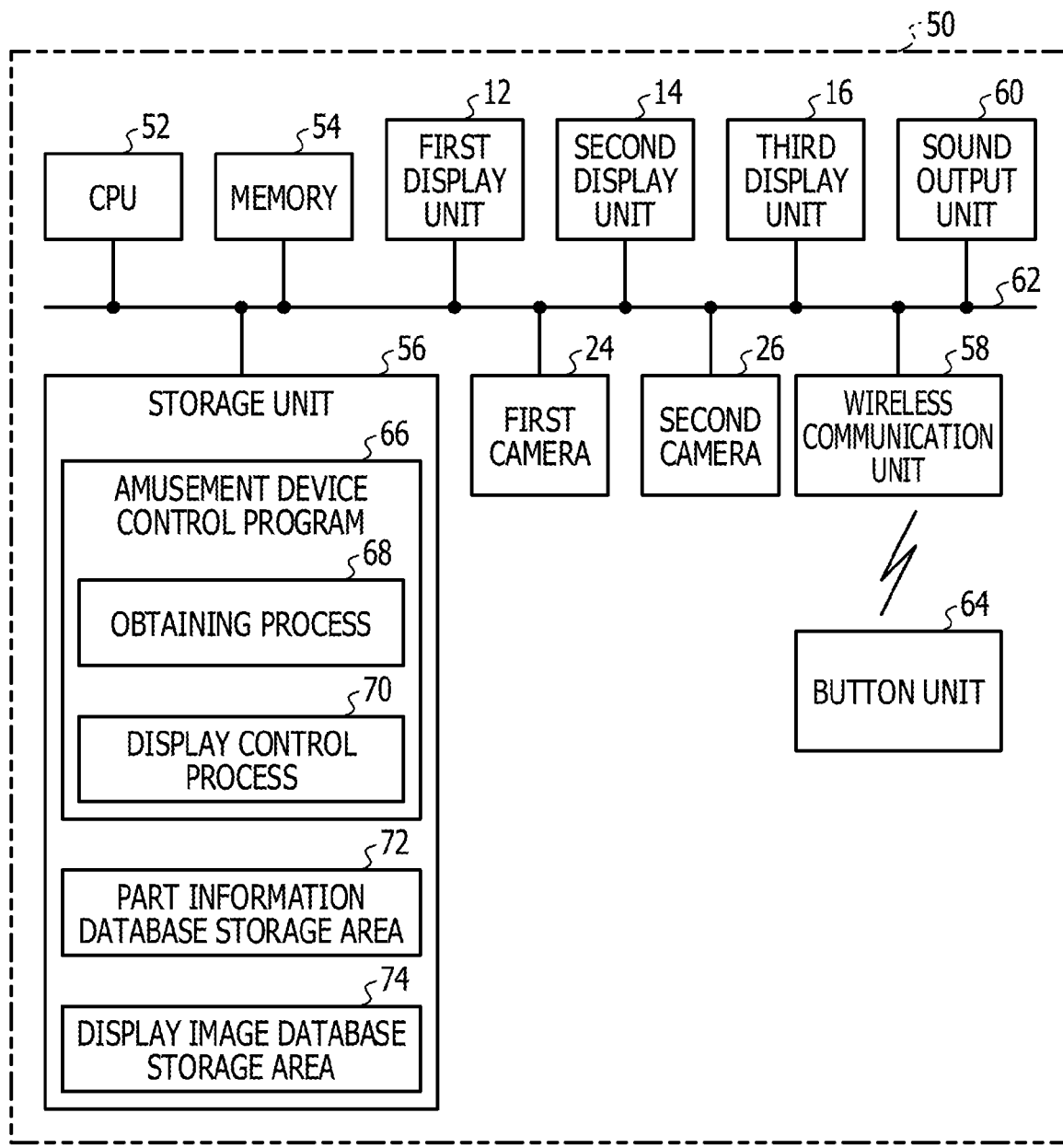
FIG. 6 is an example of a block diagram of a computer that functions as the amusement device.

The amusement device 10 is achieved by a computer 50 illustrated in FIG. 6. The computer 50 includes a central processing unit (CPU) 52, a memory 54, a storage unit 56, a first display unit 12, a second display unit 14, a third display unit 16, a first camera 24, a second camera 26, a wireless communication unit 58, and a sound output unit 60. The CPU 52, the memory 54, the storage unit 56, the first display unit 12, the second display unit 14, the third display unit 16, the first camera 24, the second camera 26, the wireless communication unit 58, and the sound output unit 60 are connected to one another through a bus 62. The wireless communication unit 58 is provided with a "done" button and includes a wireless communication section and wirelessly communicates with a "done" button unit 64 (refer to FIG. 2) that functions as the input unit 30.

The storage unit 56 is achieved by a hard disk drive (HDD), a solid-state drive (SSD), a flash memory, or the like. The storage unit 56 stores an amusement device control program 66 for causing the computer 50 to function as the amusement device 10. The CPU 52 reads the amusement device control program 66 from the storage unit 56, loads the amusement device control program 66 into the memory 54, and sequentially performs processes included in the amusement device control program 66. The amusement device control program 66 includes an obtaining process 68 and a display control process 70.

The CPU 52 performs the obtaining process 68 to operate as the obtaining unit 28 illustrated in FIG. 1. The CPU 52 also performs the display control process 70 to operate as the display control unit 38 illustrated in FIG. 1. The storage unit 56 is provided with a part information database storage area 72 and a display image database storage area 74. The part information database storage area 72 stores the part information database 34 in advance, and the display image database storage area 74 stores the display image database 36 in advance. The storage unit 56 thus functions as the storage unit 32 illustrated in FIG. 1, and the computer 50 that has performed the amusement device control program 66 functions as the amusement device 10. The amusement device control program 66 may be an example of a display control program.

In a non-use state, in which the user is not using the amusement device 10, the wall members 20 and 22 are attached to the display units 12 to 16 and the amusement device 10 forms a box. The "done" button unit 64 and the other parts are stored inside the box, and the lid member is attached. In this case, the amusement device 10 is off.

When the user uses the amusement device 10 to play, the user removes the lid member and the wall members 20 and 22 from the amusement device 10 and temporarily takes out all the parts including the "done" button unit 64 from the amusement space 18 exposed as a result of the removal of the lid member and the wall members 20 and 22. The amusement device 10 is then turned on. The amusement device 10 may be automatically turned on, instead, after the removal of at least either the lid member or the wall members 20 and 22 is detected. Next, the user chooses at least one part he/she likes from the parts temporarily taken out of the amusement space 18 and arranges the chosen part in the amusement space 18 at a desired position in a desired direction. The user arranges the part in the amusement space 18 while, for example, imagining a scene around the chosen part and the position and direction of the part in the amusement space 18 match the imagined scene. After arranging the at least one part in the amusement space 18, the user presses the "done" button of the "done" button unit 64. The pressing of the "done" button may be an example of a certain input.

Figure 7:
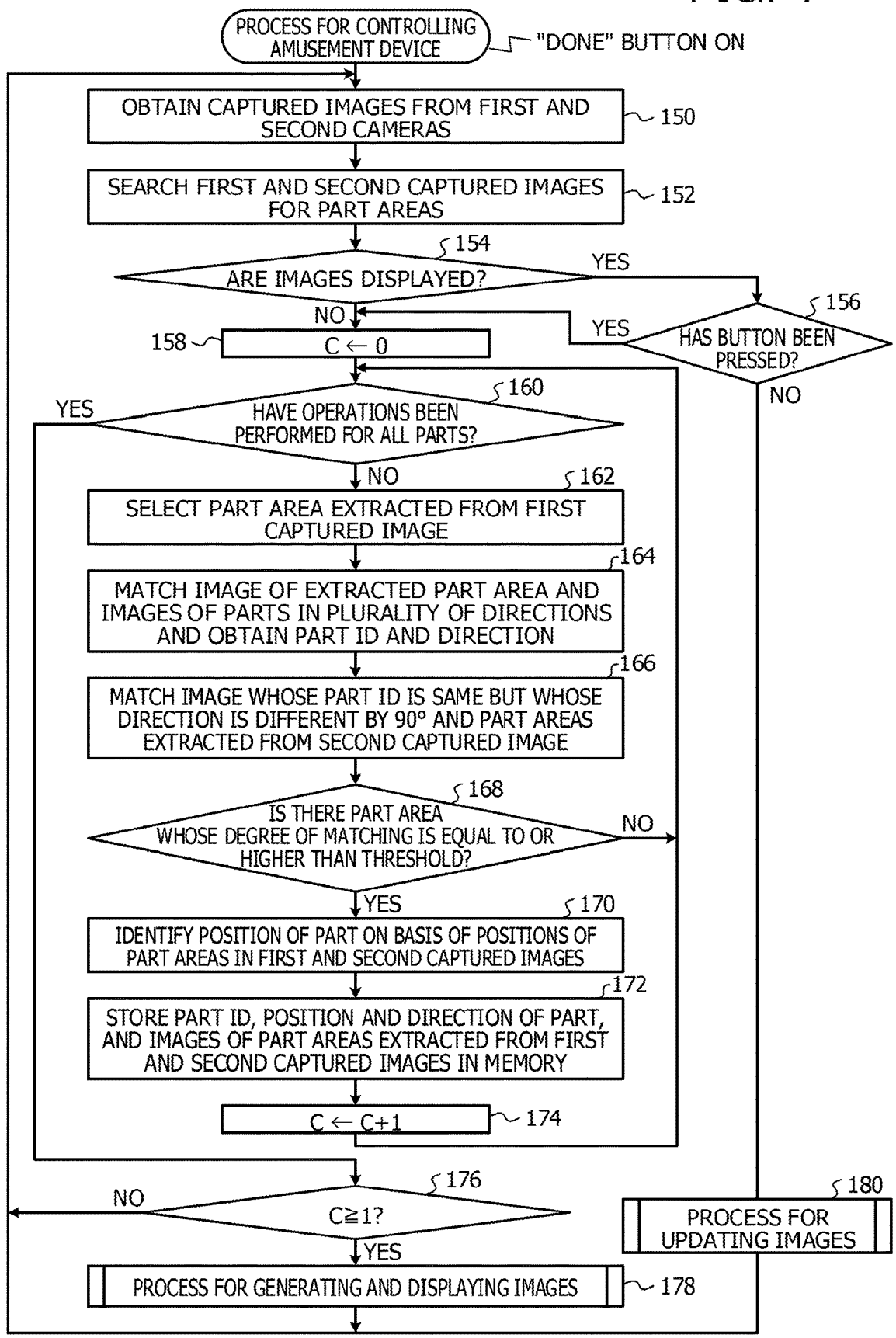
FIG. 7 illustrates an example of a process for controlling the amusement device.
Figure 8:
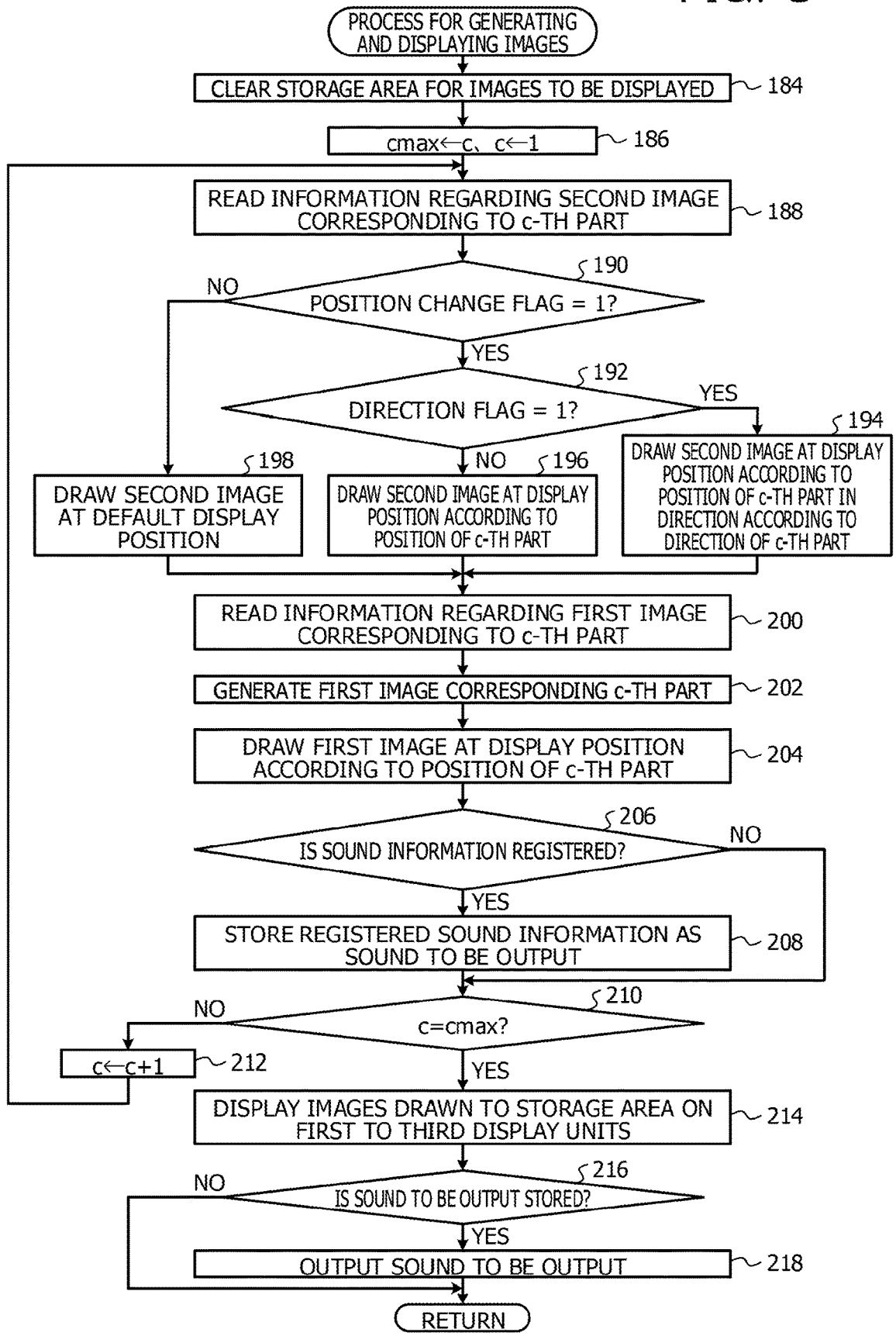
FIG. 8 illustrates an example of a process for generating and displaying images.
Figure 9:
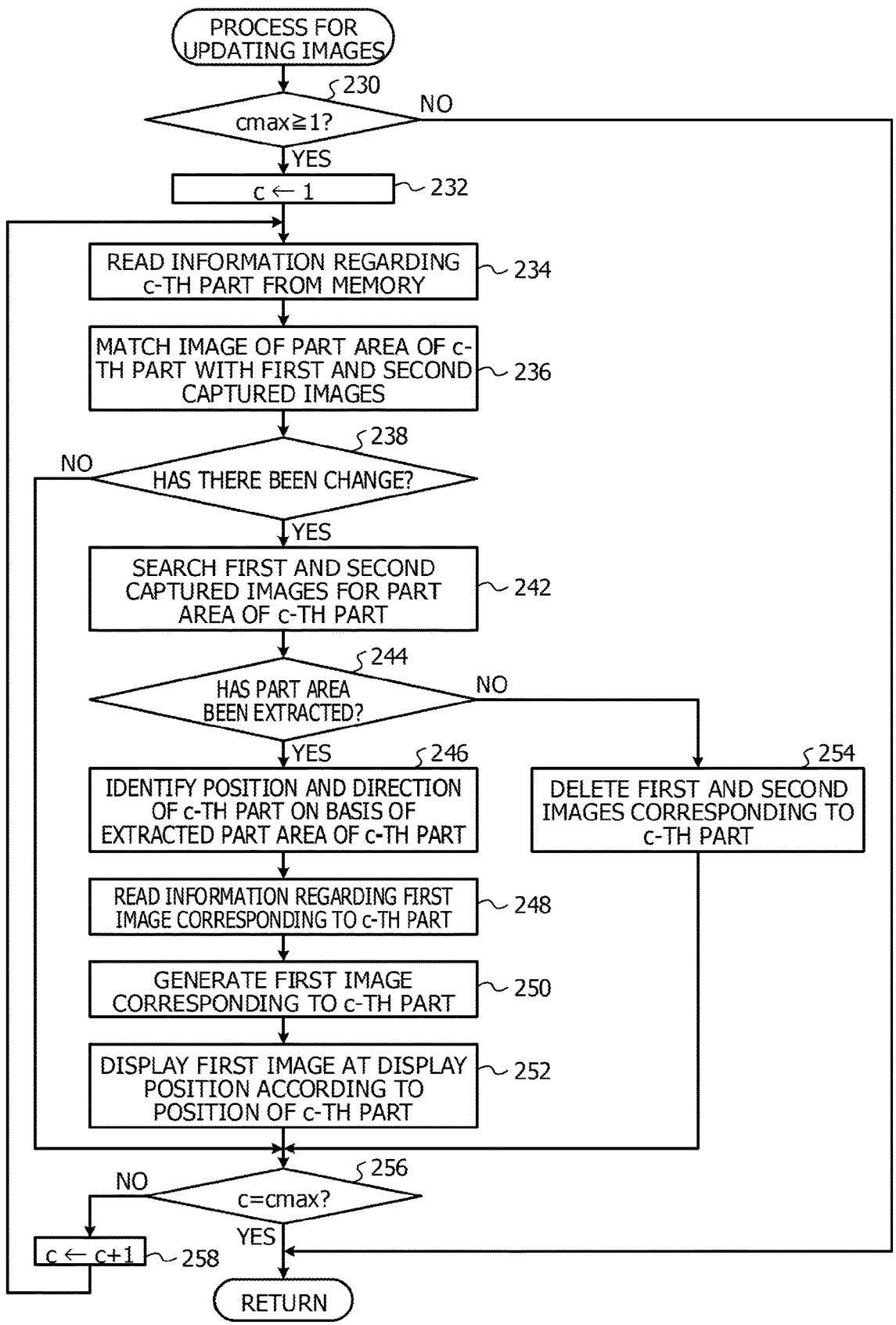
FIG. 9 illustrates an example of a process for updating images.

When the "done" button of the "done" button unit 64 has been pressed, the amusement device 10 performs (CPU 52) performs a process for controlling the amusement device 10 illustrated in FIG. 7. The process illustrated in FIG. 7 may end when the amusement device 10 is turned off. In operation 150 of the process for controlling the amusement device 10, the captured image obtaining section 28A of the obtaining unit 28 obtains a first captured image from the first camera 24 and a second captured image from the second camera 26.

Next, in operation 152, the part identification section 28B of the obtaining unit 28 searches the first and second captured images obtained by the captured image obtaining section 28A for image areas (hereinafter referred to as "part areas") corresponding to each part arranged in the amusement space 18. The part areas can be found, for example, through the following process. For example, the first and second cameras 24 and 26 capture reference images without any part arranged in the amusement space 18. The part identification section 28B then extracts differential areas, which are parts of the first and second captured images different from the reference images. By performing image processing such as reduction or expansion on the differential areas, areas corresponding to different parts are separated as independent areas. The separated areas are then labeled in order to identify part areas corresponding to each part arranged in the amusement space 18.

In operation 154, the part identification section 28B determines whether the amusement device 10 has already displayed images on the display units 12 to 16. If a result of the determination made in operation 154 is negative, the process proceeds to operation 158. In operation 158 and later operations, a type, a position, and a direction of each part arranged in the amusement space 18 are identified.

In operation 158, for example, the part identification section 28B sets 0 to a variable c, which indicates the number of parts arranged in the amusement space 18. In operation 160, the part identification section 28B determines whether operation 162 and later operations have been performed for all the part areas extracted in operation 152. If no part area has been extracted in operation 152, for example, a result of the determination made in operation 160 becomes positive, and the process proceeds to operation 176.

If at least one part area has been extracted in operation 152, a result of the determination made in operation 160 becomes negative, and the process proceeds to operation 162. In operation 162, the part identification section 28B selects a part area extracted from the first captured image as a part area to be processed. In operation 164, the part identification section 28B matches an image of the part area to be processed and each of images of parts in a plurality of directions stored in the part information database 34. The part identification section 28B obtains a part ID and a direction corresponding to an image whose degree of matching calculated in the above matching operation is highest as a part ID and a direction of the part corresponding to the part area to be processed.

Alternatively, an image whose degree of matching is highest and equal to or higher than a threshold may be selected as a matching image, instead of, as described above, simply selecting an image whose degree of matching is highest. In this case, if a degree of matching of an image is highest but lower than a certain value, for example, it may be determined that there is no applicable part, and the process may return to operation 160. A threshold used for an image of a part whose movable portion flag is 1 may be lower than one used for an image of a part whose movable portion flag is 0. This is because if a part arranged in the amusement space 18 includes a movable portion and a position of the movable portion of the part is different from a position of a movable portion in an image stored in the part information database 34, a degree of matching becomes low.

In operation 166, the part identification section 28B reads, from the part information database 34, an image whose part ID is the same as that of the image whose degree of matching calculated in the matching operation performed in operation 164 is highest but whose direction is different by 90°. The part identification section 28B matches the image read from the part information database 34 and each of the part areas extracted from the second captured image.

In operation 168, the part identification section 28B determines, based on whether the degree of matching of the part area whose degree of matching determined to be highest in operation 166 is equal to or higher than the threshold, whether there is a part area whose degree of matching is equal to or higher than the threshold in the second captured image. If a result of the determination made in operation 168 is negative, the part identification section 28B determines that a probability that the part area to be processed has the part ID and the direction obtained in operation 164 is not high enough, and the process returns to operation 160.

If a result of the determination made in operation 168 is positive, it can be determined that the probability that the part area to be processed has the part ID and the direction obtained in operation 164 is high enough, and the process proceeds to operation 170. In operation 170, the part identification section 28B identifies a position of a corresponding part in the amusement space 18 based on a position of the part area to be processed in the first captured image and a position, in the second captured image, of the part area whose degree of matching is determined to be highest in the matching operation performed in operation 166. The identified position of the part may be a position on the display surface 12A of the first display unit 12, that is, for example, a position on a two-dimensional coordinate system. Alternatively, a position in a three-dimensional coordinate system set for the amusement space 18 may be identified.

In operation 172, the part identification section 28B stores, in the memory 54, the part ID and the direction of the part obtained in operation 164, the position of the part identified in operation 170, and the images of the part areas extracted from the first and second captured images as information regarding a c-th part. In operation 174, the part identification section 28B increments the variable c by 1, and the process returns to operation 160. As a result, operations 160 to 174 are repeated until the results of the determination made in operation 160 becomes positive, that is, the process for identifying a part ID, a position, and a direction of a corresponding part is performed with each of the part areas extracted from the first captured image set as a part area to be processed.

If the result of the determination made in operation 160 becomes positive, the process proceeds to operation 176. In operation 176, the part identification section 28B determines whether the variable c is equal to or larger than 1. If a result of the determination made in operation 176 is negative, it can be determined that no part is arranged in the amusement space 18 or that an object other than the parts attached to the amusement device 10 is arranged. In this case, the process returns to operation 150 without displaying images on the display units 12 to 16.

If the result of the determination made in operation 176 is positive, at least one part is arranged in the amusement space 18. The process proceeds to operation 178. In operation 178, the display control unit 38 performs a process for generating and displaying images.

In operation 184 of the process for generating and displaying images, the display image generation section 38A of the display control unit 38 clears a storage area of the memory 54 for generating and storing images to be displayed. In operation 186, the display image generation section 38A substitutes the variable c for a total number of parts cmax (a value indicating the number of parts arranged in the amusement space 18 has been set to the variable c as a result of the process illustrated in FIG. 7) and sets 1 to the variable c.

In operation 188, the display image generation section 38A searches the display image database 36 using a part ID of the c-th part and reads, from the display image database 36, information regarding a second image corresponding to the c-th part (a second image, a position change flag, a direction flag, etc.). In operation 190, the display image generation section 38A determines whether the position change flag included in the information read in operation 188 is 1. If a result of the determination made in operation 190 is positive, the process proceeds to operation 192. In operation 192, the display image generation section 38A determines whether the direction flag included in the information read in operation 188 is 1.

If results of the determinations made in operations 190 and 192 are both positive (the position change flag=1 and the direction flag=1), it is desirable to display the second image corresponding to the c-th part at a position and in a direction according to the c-th part as in the case of the car 76 and the road 80 illustrated in FIG. 11. If the result of the determination made in operation 192 is positive, therefore, the process proceeds to operation 194. In operation 194, the display image generation section 38A draws the second image read in operation 188 to the storage area for images to be displayed such that the second image is displayed on the display units 12 to 16 at a display position according to a position of the c-th part in a direction according to a direction of the c-th part. At this time, the second image is drawn to the storage area for images to be displayed based on position change information and directional information included in the information read in operation 188. After operation 194 ends, the process proceeds to operation 200.

If the result of the determination made in operation 190 is positive but the result of the determination made in operation 192 is negative (the position change flag=1 and the direction flag=0), it is desirable to display the second image at a position according to the c-th part as in the case of the dog 88 and the dog food 92 illustrated in FIG. 15. If the result of the determination made in operation 192 is negative, the process proceeds to operation 196. In operation 196, the display image generation section 38A draws the second image read in operation 188 to the storage area for images to be displayed such that the second image is displayed on the display units 12 to 16 at a display position according to a current position of the c-th part. At this time, the second image is drawn to the storage area for images to be displayed based on the position change information included in the information read in operation 188. After operation 196 ends, the process proceeds to operation 200.

If the result of the determination made in operation 190 is negative (the position change flag=0), it is desirable to display the second image at a certain position regardless of the position of the c-th part as in the case of the rabbit 82 and the night sky 86 illustrated in FIG. 13. If the result of the determination made in operation 190 is negative, therefore, the process proceeds to operation 198. In operation 198, the display image generation section 38A draws the second image read in operation 188 to the storage area for images to be displayed such that the second image is displayed on the display units 12 to 16 at a default display position. In the example illustrated in FIG. 13, for example, the second image (an image of the night sky 86) is drawn to the storage area for images to be displayed such that the night sky 86 is displayed over the entirety of the display surfaces 14A and 16A of the display units 14 and 16. After operation 198 ends, the process proceeds to operation 200.

In operation 200, the display image generation section 38A searches the display image database 36 using the part ID of the c-th part as a key and reads, from the display image database 36, information regarding a first image corresponding to the c-th part (a movable portion flag and the first image or a three-dimensional model). In operation 202, the display image generation section 38A generates a first image corresponding to the c-th part based on the information regarding the first image read from the display image database 36 in operation 200. In operation 204, the display image generation section 38A draws the first image generated in operation 202 to the storage area for images to be displayed such that the first image is displayed on the display units 12 to 16 at a display position according to the position of the c-th part.

When the c-th part is the car 76, the rabbit 82, or the bird, the first image can be a shadow of the part (refer to the shadow 78 illustrated in FIGS. 10 and 11 and the shadow 84 illustrated in FIGS. 12 and 13). since these parts do not include a movable portion, the information regarding the first image read from the display image database 36 in operation 200 includes a movable portion flag=0 and an image, which is the first image, of a shadow of the part whose degree of transparency is higher than 0.

In the case of a mode in which an image of a shadow of a part specifies an area and a degree of transparency of the shadow, for example, an image drawn in the area of the shadow according to a position of the c-th part is read from the storage area for images to be displayed and modified in accordance with the specified degree of transparency by, for example, increasing density. In operation 204, the image subjected to operation 202 is drawn again in the same part of the storage area for images to be displayed. As a result, the shadow of the part is displayed at a position corresponding to the part as in the case of the shadow 78 illustrated in FIGS. 10 and 11 and the shadow 84 illustrated in FIGS. 12 and 13. A format of the image of the shadow is not limited to the above-described one.

When the c-th part is the dog 88 or the cat, the first image can be a shadow and footprints of the part (refer to the shadow and footprints 90 illustrated in FIGS. 14 and 15). Since these parts do not include a movable portion either, the information regarding the first image read from the display image database 36 in operation 200 includes a movable portion flag=0 and an image, which is the first image, of a shadow and footprints whose degree of transparency is higher than 0. A process for displaying a shadow and footprints of a part can be achieved through the same process as the above-described process for displaying a shadow of a part.

When the c-th part is the whale 94, the first image can be waves (refer to the waves 96 illustrated in FIGS. 16 and 17). Since the whale 94 does not include a movable portion, the information regarding the first image read from the display image database 36 in operation 200 includes a movable portion flag=0 and a moving image of waves as the first image. In this case, in operation 202, still images of waves at different points in time are sequentially generated from the moving image of waves. In operation 204, the still images of waves at different points in time generated in operation 202 are sequentially drawn to the storage area for images to be displayed at a position according to the position of the c-th part.

When the c-th part is the flower 100, the first image can be a shadow of the flower 100, surrounding smaller flowers, and a butterfly (refer to the shadow 102, the smaller flowers 104, and the butterfly 106 illustrated in FIGS. 18 and 19). Since the flower 100 does not include a movable portion either, the information regarding the first image read from the display image database 36 in operation 200 includes a movable portion flag=0, an image, which is the first image, of a shadow whose degree of transparency is higher than 0, an image of the surrounding smaller flowers, and a moving image of the butterfly. The moving image of the butterfly can be displayed through the same process as for the waves for the whale 94. As illustrated in FIGS. 18 and 19, display areas of the shadow 102 and the smaller flowers 104 overlap. With respect to the shadow of the flower 100 and the surrounding smaller flowers 104, therefore, the image of the shadow and the image of the surrounding smaller flowers included in the information regarding the first image read in operation 200 are sequentially drawn to the storage area for images to be displayed at positions according to the position of the c-th part.

When the c-th part is the house 110, the first image can be a shadow of the house 110 and a shadow of the window 110A that moves as the window 110A opens and closes (refer to the shadow 112 illustrated in FIGS. 20 and 21 and the shadow 114 illustrated in FIG. 21). Since the window 110A of the house 110 is openable, the information regarding the first image read from the display image database 36 in operation 200 includes a movable portion flag=1 and a three-dimensional model obtained by modeling the house 110 with the openable window 110A set as a movable portion.

In this case, in operation 202, first, a current position of the movable portion of the c-th part is identified based on an image of a part area of the c-th part stored in the memory 54. Next, the position of the movable portion of the c-th part in the three-dimensional model is matched with the identified current position of the movable portion. Next, a position of a light source for forming the shadows of the c-th part and the movable portion is set, and areas of the shadows of the c-th part and the movable portion are calculated based on the three-dimensional model including the set position of the light source and the position of the movable portion. Operations to be performed after the calculation of the areas of the shadows are the same as in the above-described case of the display of the shadow of the car 76 or the like, and description thereof is omitted.

As a result of the process up to operation 204, the first and second images corresponding to the c-th part have been drawn to the storage area for images to be displayed. In operation 206, the display image generation section 38A determines whether sound information corresponding to the c-th part is registered in the display image database 36. If a result of the determination made in operation 206 is positive, the process proceeds to operation 208. In operation 208, the display image generation section 38A stores, in the memory 54, the sound information corresponding to the c-th part registered in the display image database 36 as a sound to be output, and the process proceeds to operation 210. If the result of the determination made in operation 206 is negative, the process proceeds to operation 210 while skipping operation 208.

In operation 210, the display image generation section 38A determines whether the variable c has reached the total number of parts cmax. If a result of the determination made in operation 210 is negative, the process proceeds to operation 212. In operation 212, the display image generation section 38A increments the variable c by 1, and the process returns to operation 118. As a result, operations 188 to 212 are repeated until the result of the determination made in operation 210 becomes positive, that is, first and second images corresponding to all parts arranged in the amusement space 18 are drawn to the storage area for images to be displayed. With respect to parts for which corresponding sound information is registered in the display image database 36, the corresponding sound information is stored in the memory 54 as sounds to be output.

If the result of the determination made in operation 210 is positive, the process proceeds to operation 214. In operation 214, the display image generation section 38A of the display control unit 38 displays the images drawn to the storage area on the display units 12 to 16. In operation 216, the display control unit 38 determines whether a sound to be output is stored in the memory 54. If a result of the determination made in operation 216 is positive, the process proceeds to operation 218. In operation 218, the display control unit 38 causes the sound output unit 60 to output the sound to be output stored in the memory 54, and the process for generating and displaying images ends. If the result of the determination made in operation 216 is negative, the process for generating and displaying images ends while skipping operation 218.

As a result of the above process, when the car 76 is arranged in the amusement space 18, for example, the first display unit 12 displays, as illustrated in FIG. 11, the shadow 78 of the car 76 at a position according to the car 76 and the road 80 at a position according to a position and a direction of the car 76 in a longitudinal direction of the car 76. The sound output unit 60 outputs driving sounds of the car 76. In addition, when the rabbit 82 is arranged in the amusement space 18, for example, the first display unit 12 displays, as illustrated in FIG. 13, the shadow 84 of the rabbit 82 at a position according to the rabbit 82, and the second and third display units 14 and 16 display the night sky 86.

When the dog 88 is arranged in the amusement space 18, for example, the first display unit 12 displays, as illustrated in FIG. 15, the shadow and footprints 90 of the dog 88 and the dog food 92 at a position according to a position of the dog 88. The sound output unit 60 outputs a cry of the dog 88. When the whale 94 is arranged in the amusement space 18, for example, the first display unit 12 displays, as illustrated in FIG. 17, the waves 96 according to a position of the whale 94 and the water surface 98 in a certain area according to the position of the whale 94. The sound output unit 60 outputs a sound of the waves 96.

When the flower 100 is arranged in the amusement space 18, for example, the first display unit 12 displays, as illustrated in FIG. 19, the shadow 102 of the flower 100, the surrounding smaller flowers 104, and the butterfly 106 at positions according to a position of the flower 100. The flower garden 108 is displayed in a certain area according to the position of the flower 100. When the house 110 is arranged in the amusement space 18, for example, the first display unit 12 displays, as illustrated in FIG. 21, the shadow 112 of the house 110 at a position according to a position of the house 110. If the window 110A is open, the shadow 114 of the window 110A is displayed at a position according to a position of the window 110A. Furthermore, the stone pavement 116 is displayed in a certain area according to the position of the house 110.

The first and second images displayed on the display units 12 to 16 as a result of the above process do not necessarily match a scene imagined by the user when he/she arranged a part in the amusement space 18. Since the first and second images displayed by the amusement device 10 on the display units 12 to 16 are images relating to the part arranged by the user in the amusement space 18, however, it is possible to catch the user's interest in playing with the amusement device 10. The user watches the displayed first and second images and, for example, changes a position of the part arranged in the amusement space 18 or adds another part to the amusement space 18.

Although the process returns to operation 150 illustrated in FIG. 7 after the process for generating and displaying images ends, the result of the determination made in operation 154 is positive and the process proceeds to operation 156 since the first and second images have already been displayed on the display units 12 to 16. In operation 156, the part identification section 28B determines whether the "done" button of the "done" button unit 64 has been newly pressed. If a result of the determination made in operation 156 is negative, the process proceeds to operation 180, and a process for updating images is performed.

In operation 230 of the process for updating images, the display image generation section 38A determines whether the total number of parts cmax is equal to or larger than 1, that is, whether at least one part is arranged in the amusement space 18. If a result of the determination made in operation 230 is negative, the process for updating images ends. If at least one part is arranged in the amusement space 18, the result of the determination made in operation 230 becomes positive, and the process proceeds to operation 232. In operation 232, the display image generation section 38A sets 1 to the variable c.

In operation 234, the display image generation section 38A reads information (a part ID, a position, a direction, and an image of a part area) regarding the c-th part, which is a part to be processed, from the memory 54. In operation 236, the display image generation section 38A matches the image of the part area of the c-th part included in the information read in operation 234 with the first and second captured images. In operation 238, the display image generation section 38A determines, based on whether a degree of matching calculated in the matching operation performed in operation 236 is lower than a threshold, whether there has been a change in the position of the c-th part or the like. If a result of the determination made in operation 238 is negative, it can be determined that the position of the c-th part, which is the part to be processed, has not been changed since the c-th parts was arranged in the amusement space 18, and the process proceeds to operation 256.

If the user moves the c-th part arranged in the amusement space 18 or the movable portion of the c-th part, on the other hand, the result of the determination made in operation 238 becomes positive, and the process proceeds to operation 242. In operation 242, the display image generation section 38A searches the first and second captured images for the part area of the c-th part, which is the part to be processed. In operation 244, the display image generation section 38A determines whether the part area of the c-th part has been extracted from the first and second captured images as a result of the search performed in operation 242.

A part to be processed is a part that, when arranged in the amusement space 18, can be recognized in the first and second captured images. If a part area of a part to be processed is not extracted as a result of the search performed in operation 242, therefore, it is likely that the part to be processed has been removed from the amusement space 18. If a result of the determination made in operation 244 is negative, therefore, the process proceeds to operation 254.

In operation 254, the display image generation section 38A deletes the first and second images corresponding to the c-th part, which is the part to be processed, from the storage area for images to be displayed. The display image generation section 38A then displays images stored in the storage area on the display units 12 to 16. As a result, the first and second images corresponding to the c-th part, which is the part to be processed, are deleted from the images displayed on the display units 12 to 16. After operation 254 is performed, the process proceeds to operation 256.

If the part area of the part to be processed is extracted from the search performed in operation 242, the result of the determination made in operation 244 becomes positive, and the process proceeds to operation 246. In operation 246, the display image generation section 38A identifies a position and a direction of the c-th part through the same process as in the above-described operation 164 based on the image of the part area of the c-th part extracted in the search performed in operation 242.

In operation 248, the display image generation section 38A reads information regarding a first image corresponding to the c-th part through the same process as in operation 200. In operation 250, the display image generation section 38A generates the first image corresponding to the c-th part through the same process as in operation 200.

In operation 252, the display image generation section 38A draws the first image generated in operation 250 to the storage area for images to be displayed through the same process as in operation 204 such that the first image is displayed at a display position according to the position of the c-th part. The display image generation section 38A then displays the image stored in the storage area on the display units 12 to 16. After operation 252 is performed, the process proceeds to operation 256.

In operation 256, the display image generation section 38A determines whether the variable c has reached the total number of parts cmax. If a result of the determination made in operation 256 is negative, the process proceeds to operation 258. In operation 258, the display image generation section 38A increments the variable c by 1, and the process returns to operation 234. As a result, operations 234 to 258 are repeated until the result of the determination made in operation 256 becomes positive, that is, first images corresponding to all parts that have been arranged in the amusement space 18 and whose positions or the like have been changed are updated. If the result of the determination made in operation 256 becomes positive, the process for updating images ends.

As a result of the above process, if the car 76 arranged in the amusement space 18 is moved from a position indicated by a solid line in FIG. 11 to a position indicated by a semitransparent line, for example, the shadow 78, which is an example of the first image, of the car 76 is moved to a display position according to the new position of the car 76. The road 80, which is an example of the second image, remains displayed at an original position in an original direction regardless of the change in the position of the car 76.

If the rabbit 82 arranged in the amusement space 18 is moved from a position indicated by a solid line in FIG. 13 to a position indicated by a semitransparent line, for example, the shadow 84, which is an example of the first image, of the rabbit 82 is moved to a display position according to the new position of the rabbit 82. The night sky 86, which is an example of the second image, remains displayed at an original position regardless of the change in the position of the rabbit 82.

If the dog 88 arranged in the amusement space 18 is moved from a position indicated by a solid line in FIG. 15 to a position indicated by a semitransparent line, for example, the shadow and footprints 90, which are an example of the first image, of the dog 88 are moved to a display position according to the new position of the dog 88. The dog food 92, which is an example of the second image, on the other hand, remains displayed at an original position regardless of the change in the position of the dog 88.

If the whale 94 arranged in the amusement space 18 is moved from a position indicated by a solid line in FIG. 17 to a position indicated by a semitransparent line, for example, the waves 96, which are an example of the first image, are moved to a display position according to the new position of the whale 94. The water surface 98, which is an example of the second image, remains displayed in an original display area regardless of the change in the position of the whale 94.

If the flower 100 arranged in the amusement space 18 is moved from a position indicated by a solid line in FIG. 19 to a position indicated by a semitransparent line, for example, the shadow 102 of the flower 100, the surrounding smaller flowers 104, and the butterfly 106, which are examples of the first image, are moved to display positions according to the new position of the flower 100. The flower garden 108, which is an example of the second image, remains displayed in an original display area regardless of the change in the position of the flower 100.

If the window 110A of the house 110 arranged in the amusement space 18 is moved from a closed position indicated by a solid line in FIG. 20 to an open position illustrated in FIG. 21, for example, the shadow 114 of the window 110A is added, as illustrated in FIG. 21, to the shadow 112 of the house 110, which is an example of the first image. The stone pavement 116, which is an example of the second image, remains displayed in an original display area regardless of the change in the position of the window 110A.

As a result of the above process, the first image displayed on the display units 12 to 16 can be changed through a simple operation performed by the user, that is, by moving a part arranged in the amusement space 18. As a result, the user can feel that he/she has created a piece of work including the part arranged in the amusement space 18 and the first and second images displayed on the display units 12 to 16 in accordance with the arrangement of the part. The user's interest in playing with the amusement device 10 further grows.

Since the display position of the first image changes in accordance with the change in the position of the part, the reality of the part arranged in the amusement space 18 to the user improves. Since the display position of the first image follows the change in the position of the part, it is possible for the amusement device 10 to realize a scene imagined by the user while moving the part.

Since the second image does not change in accordance with the change in the position of the part, the second image represents a scene completed in accordance with the original position of the part in the amusement space 18, and the user can feel a sense of security. If the user desires to update the second image, the user can replace the part in the amusement space 18 and then newly press the "done" button of the "done" button unit 64. As a result, the result of the determination made in operation 156 illustrated in FIG. 7 becomes positive, and the process proceeds to operation 158. Operation 158 and later operations are then performed again, and new first and second images are displayed on the display units 12 to 16 in accordance with the arrangement of a new part in the amusement space 18.

As described above, in the present embodiment, if a certain input is received through the input unit 30, the obtaining unit 28 obtains a type and a position of a part arranged in the amusement space 18. The display control unit 38 determines, in accordance with the obtained position of the part, display positions of a first image and a second image whose position change flag is 1 on the display units 12 to 16 defining the amusement space 18 among first images and second images relating to the type of part. The display control unit 38 then displays the first and second images on the display units 12 to 16. After receiving the certain input through the input unit 30, the display control unit 38 changes the display position of the first image in accordance with a change in the position of the part in the amusement space 18 but continues to display the second image without changing the display position. As a result, the user can simultaneously see the part arranged in the amusement space 18 and the first and second images displayed on the display units 12 to 16, and an augmented reality where the first and second images are added to the part arranged in the amusement space 18 is achieved. In addition, the user can change the first image, which is displayed along with the part arranged in the amusement space 18 and the second image, through a simple operation.

The obtaining unit 28 also obtains a direction of the part arranged in the amusement space 18. The display control unit 38 determines a display direction of the second image whose direction flag is 1 in accordance with the direction of the part obtained by the obtaining unit 28. As a result, even if at least the second image relating to the part arranged in the amusement space 18 is an image to be displayed in a direction according to the direction of the part (direction flag=1), the display direction of the second image does not become unnatural.

If the part arranged in the amusement space 18 includes a movable portion, the obtaining unit 28 obtains a position of the movable portion of the part, and the display control unit 38 changes the first image in accordance with the position of the movable portion obtained by the obtaining unit 28. As a result, if the part arranged in the amusement space 18 includes a movable portion, the reality of the first image relating to the part increases.

The display device includes the first display unit 12 whose display surface 12A forms the bottom surface of the amusement space 18 and the second and third display units 14 and 16 whose display surfaces 14A and 16A form the side surfaces of the amusement space 18. The display control unit 38 displays the first and second images on at least either the first display unit 12 or the second and third display units 14 and 16. The display units 12 to 16 thus define and surround the amusement space 18. As a result, the part arranged in the amusement space 18 and the first and second images displayed on the display units 12 to 16 together exhibit a sense of unity, and the user's interest further grows.

Although a mode in which the display direction of the second image whose direction flag=1 (e.g., the road 80 illustrated in FIG. 11) is changed in accordance with a direction of a corresponding part has been described, the mode employed is not limited to this. A direction of the first image may also be changed in accordance with the direction of the corresponding part. For example, when a shadow, which is an example of the first image, of a part is displayed, a direction of the part may be obtained, and the shadow of the part may be changed in accordance with the obtained direction of the part. As a result, the display accuracy of the shadow of the part improves.

The shadow of the part may be generated based on a position of a light source and a three-dimensional model of the part as in the process for generating shadows (e.g., the shadows 112 and 114 illustrated in FIG. 21) corresponding to a part including a movable portion. The night sky 86 illustrated in FIG. 13, for example, is a moving image in which the sun sets and the moon rises. Because a position of a light source of the moving image changes over time, the process for generating a shadow of a part may be used to display this kind of background as the second image. As a result, a shadow of a part can be changed in accordance with a change in a position of a light source.

Although a mode in which a single set of first and second images corresponding to each part is registered in the display image database 36 has been described, the number of sets of first and second images used is not limited to this. For example, at least either a plurality of first images or a plurality of second images corresponding to each part may be registered in the display image database 36, and images selected from the plurality of images randomly or in a certain order may be displayed.

Although a mode in which a part attached to the amusement device 10 is arranged in the amusement space 18 has been described, corresponding first and second images may be displayed even when an object other than a part attached to the amusement device 10 is arranged in the amusement space 18. More specifically, for example, it is determined that a part area to be processed includes an object other than a part if an image whose degree of matching is equal to or higher than the threshold has not been registered in the part information database 34 in operation 164 illustrated in FIG. 7 or if there is no part area whose degree of matching is equal to or higher than the threshold in the second captured image in operation 168. In this case, a type of object corresponding to a part area to be processed is determined based on a shape of the part area to be processed, the arrangement of feature points, or the like, and a part ID of a part similar to the object is determined in the part information database 34 based on the determined type of object. First and second images corresponding to the determined part ID in the display image database 36 may then be displayed, and a display position of the first image may be changed in accordance with a change in a position of the object.

Although a mode in which a type, a position, and a direction of a part arranged in the amusement space 18 are identified (obtained) based on first and second captured images, which are images of the amusement space 18, has been described, the method for identifying a type, a position, and a direction of a part used is not limited to this. For example, an integrated circuit (IC) tag may be provided for each part, and short-distance wireless communication such as near-field communication (NFC) may be performed for an IC tag of a part arranged in the amusement space 18 in order to obtain a type, a position, and a direction of the part arranged in the amusement space 18.

In this case, at least one IC tag reader may be provided instead of the first and second cameras 24 and 26 illustrated in FIG. 1, and the captured image obtaining section 28A of the obtaining unit 28 does not have to be provided. The IC tag reader may be connected to a plurality of antennas provided at different positions, for example, and each antenna may detect a position of a part based on the distribution of the field strength of radio waves received from an IC tag. The IC tag reader may be configured, for example, to detect a type of part provided with an IC tag based on identification information included in information received from the IC tag.

In this case, in the computer 50 (FIG. 6) that functions as the amusement device 10, the IC tag reader may be connected to the bus 62 instead of the first and second cameras 24 and 26. Furthermore, in this case, in the process for controlling the amusement device 10 (FIG. 7), the obtaining of captured images, the search for a part area, the matching of images, and the like (operations 150, 152, and 160 to 174) do not have to be performed. Instead of these operations, for example, a process for obtaining a position (or a position and a type) of a part detected by the IC tag reader from the IC tag reader may be performed.

Although the first to third display units 12, 14, and 16 achieved by LCDs, OELDs, or the like as an example of the display device in the above description, the display device is not limited to this. The display device may be a projector or the like that projects images using a wall of a room as a display area, instead.

Although a mode in which the amusement device control program 66, which is an example of a display control program, is stored (installed) in the storage unit 56 in advance has been described, the display control program does not have to be stored in the storage unit 56. The display control program in the present disclosure may be stored in a recording medium such as a compact disc read-only memory (CD-ROM), a digital versatile disc read-only memory (DVD-ROM), or a memory card and then be provided.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A display control method comprising:
obtaining, by a computer, a position of an object which is arranged in an area when receiving an input;
acquiring, by referring to information in which first information of a first image whose display position is changed in accordance with a change in the position of the object and second information of a second image whose display position is not changed in accordance with the change in the position of the object are associated with each other, the first information and the second information corresponding to the object;
determining a second display position of the second image in a display area of a display device adjacent to the area based on the second information;
determining a first display position of the first image in the display area of a display device adjacent to the area based on the position of an object;
displaying the first image and the second image on the display device; and
changing, after receiving the input and based on the first information, the first display position of the first image in accordance with the change in the position of the object in the area without changing the second display position of the second image,
wherein the first information includes a movable portion flag which indicates whether the first image includes a movable portion in accordance with the change in the position of the object, and
the second information includes a position change flag which indicates whether to change the second display position of the second image in accordance with the position of the object and a direction flag which indicates whether to change a display direction of the second image in accordance with a direction of the object.

2. The display control method according to claim 1, wherein the obtaining includes: obtaining a type of the object is also obtained, and
the first information and the second information relating to the type of the object are acquired by referring to a storage storing the information.

3. The display control method according to claim 1, wherein the obtaining includes: obtaining a direction of the object, and
a display direction of the second image is determined in accordance with the direction of the object.

4. The display control method according to claim 3, wherein the obtaining includes: obtaining, when the object arranged in the area includes a movable portion, a position of the movable portion of the object, and wherein the first image is changed in accordance with the position of the movable portion of the object.

5. The display control method according to claim 1, wherein the display device includes a first display including a display surface corresponding to a bottom surface of the area and a second display including a display surface corresponding to a side surface of the area, and wherein the displaying includes: displaying the first image and the second image on the first display and the second display, respectively.

6. A display control device comprising:
a memory that stores a display control program; and
a processor that performs, based on the display control program, operations of:
obtaining a position of an object which is arranged in an area when receiving an input;
acquiring, by referring to information in which first information of a first image whose display position is changed in accordance with a change in the position of the object and second information of a second image whose display position is not changed in accordance with the change in the position of the object are associated with each other, the first information and the second information corresponding to the object;
determining a second display position of the second image in a display area of a display device adjacent to the area based on the second information;
determining a first display position of the first image in the display area of a display device adjacent to the area based on the position of an object;
displaying the first image and the second image on the display device; and
changing, after receiving the input and based on the first information, the first display position of the first image in accordance with the change in the position of the object in the area without changing the second display position of the second image,
wherein the first information includes a movable portion flag which indicates whether the first image includes a movable portion in accordance with the change in the position of the object, and
the second information includes a position change flag which indicates whether to change the second display position of the second image in accordance with the position of the object and a direction flag which indicates whether to change a display direction of the second image in accordance with a direction of the object.

7. The display control device according to claim 6, wherein the obtaining includes: obtaining a type of the object is also obtained, and
the first information and the second information relating to the type of the object are acquired by referring to a storage storing information.

8. The display control device according to claim 6, wherein the obtaining includes: obtaining a direction of the object, and
a display direction of the second image is determined in accordance with the direction of the object.

9. The display control device according to claim 8, wherein the obtaining includes: obtaining, when the object arranged in the area includes a movable portion, a position of the movable portion of the object, and
wherein the first image is changed in accordance with the position of the movable portion of the object.

10. The display control device according to claim 6, wherein the display device includes a first display including a display surface corresponding to a bottom surface of the area and a second display including a display surface corresponding to a side surface of the area, and
wherein the displaying includes: displaying the first image and the second image on the first display and the second display, respectively.

11. A non-transitory computer-readable recording medium storing a display control program which causes a computer to execute operations, the operations comprising:
obtaining a position of an object which is arranged in an area when receiving an input;
acquiring, by referring to information in which first information of a first image whose display position is changed in accordance with a change in the position of the object and second information of a second image whose display position is not changed in accordance with the change in the position of the object are associated with each other, the first information and the second information corresponding to the object;
determining a second image in a display area of a display device adjacent to the area based on the second information;
determining a first display position of the first image in the display area of a display device adjacent to the area based on the position of an object;
displaying the first image and the second image on the display device; and
changing, after receiving the input and based on the first information, the first display position of the first image in accordance with the change in the position of the object in the area without changing the second display position of the second image,
wherein the first information includes a movable portion flag which indicates whether the first image includes a movable portion in accordance with the change in the position of the object, and
the second information includes a position change flag which indicates whether to change the second display position of the second image in accordance with the position of the object and a direction flag which indicates whether to change a display direction of the second image in accordance with a direction of the object.

12. The non-transitory computer-readable recording medium according to claim 11, wherein the obtaining includes: obtaining a type of the object is also obtained, and
the first information and the second information relating to the type of the object are acquired by referring to a storage storing information.

13. The non-transitory computer-readable recording medium according to claim 11, wherein the obtaining includes: obtaining a direction of the object, and
a display direction of the second image is determined in accordance with the direction of the object.

14. The non-transitory computer-readable recording medium according to claim 13, wherein the obtaining includes: obtaining, when the object arranged in the area includes a movable portion, a position of the movable portion of the object, and
wherein the first image is changed in accordance with the position of the movable portion of the object.

15. The non-transitory computer-readable recording medium according to claim 11, wherein the display device includes a first display including a display surface corresponding to a bottom surface of the area and a second display including a display surface corresponding to a side surface of the area, and wherein the displaying includes: displaying the first image and the second image on the first display and the second display, respectively.

* * * * *